(12) United States Patent
Volk et al.

(10) Patent No.: US 7,275,252 B2
(45) Date of Patent: Sep. 25, 2007

(54) CELL PHONE OR OTHER PORTABLE HANDSET CONTAINING MICROMINIATURE OPTICAL DISC DRIVE

(75) Inventors: Steven B. Volk, Boulder, CO (US); Gregory Dimitri Volan, Longmont, CO (US)

(73) Assignee: Vmedia Research, Inc., Boulder, CO (US)

( * ) Notice: Subject to any disclaimer, the term of this patent is extended or adjusted under 35 U.S.C. 154(b) by 0 days.

(21) Appl. No.: 11/234,356

(22) Filed: Sep. 23, 2005

(65) Prior Publication Data

US 2006/0062095 A1      Mar. 23, 2006

Related U.S. Application Data

(63) Continuation-in-part of application No. 10/423,701, filed on Apr. 25, 2003, now Pat. No. 7,058,959, and a continuation-in-part of application No. 10/846,849, filed on May 13, 2004.

(51) Int. Cl.
*G11B 17/03* (2006.01)

(52) U.S. Cl. .................................................. 720/630

(58) Field of Classification Search ............ 369/30.19; 455/3.06, 74, 557
See application file for complete search history.

(56) References Cited

U.S. PATENT DOCUMENTS

| | | | | |
|---|---|---|---|---|
| 6,052,279 | A | 4/2000 | Friend et al. | 361/686 |
| 6,091,563 | A | 7/2000 | Thomas et al. | 360/69 |
| 6,137,759 | A | 10/2000 | Ogiro et al. | 720/640 |
| 6,185,069 | B1 | 2/2001 | Schick | 360/133 |
| 6,442,637 | B1 | 8/2002 | Hawkins et al. | 710/300 |
| 6,525,932 | B1 | 2/2003 | Ohnishi et al. | 361/686 |
| 6,628,939 | B2 | 9/2003 | Paulsen | 455/414.1 |
| 6,687,215 | B1 * | 2/2004 | Bagnell et al. | 720/740 |
| 6,751,694 | B2 | 6/2004 | Liu et al. | 710/301 |
| 6,762,906 | B1 | 7/2004 | Wakita et al. | 360/97.01 |
| 6,813,661 | B2 | 11/2004 | Li | 710/62 |
| 6,826,018 | B2 | 11/2004 | Kuwajima et al. | 360/254.3 |
| 6,873,524 | B2 | 3/2005 | Kaczeus et al. | 361/685 |
| 6,914,594 | B2 | 7/2005 | Chuang | 345/169 |
| 6,930,987 | B1 | 8/2005 | Fukuda et al. | 370/328 |
| 6,934,568 | B2 | 8/2005 | Charlier et al. | 455/575.3 |

(Continued)

FOREIGN PATENT DOCUMENTS

WO      WO 00/74049      12/2000

(Continued)

OTHER PUBLICATIONS

Patent Abstracts of Japan, vol. 2003, No. 01, Jan. 14, 2003 & JP 2002 269960 A (Toshiba Corp.), Sep. 20, 2002.

(Continued)

*Primary Examiner*—Angel Castro
(74) *Attorney, Agent, or Firm*—David E. Steuber

(57) ABSTRACT

A microminiature optical disc drive is mounted in a cell phone or other handheld portable device to provide a large data source for playing games, movies and other digital content on the device. The optical disc drive is manufactured to an extremely small form factor by, among other things, employing a blue laser beam and a high numerical aperture lens in the optics assembly.

14 Claims, 24 Drawing Sheets

U.S. PATENT DOCUMENTS

| | | | |
|---|---|---|---|
| 6,947,254 B2 | 9/2005 | Edwards et al. | 360/99.09 |
| 7,018,696 B2* | 3/2006 | Nee | 428/64.1 |
| 7,045,187 B2* | 5/2006 | Nee | 428/64.1 |
| 7,054,963 B2 | 5/2006 | Betts-LaCroix et al. | 710/62 |
| 7,197,584 B2 | 3/2007 | Huber et al. | 710/72 |
| 2001/0047453 A1 | 11/2001 | Edwards et al. | 711/115 |
| 2002/0048224 A1 | 4/2002 | Dygert et al. | 369/1 |
| 2003/0007640 A1* | 1/2003 | Harada et al. | 380/270 |
| 2003/0231570 A1 | 12/2003 | Oishi | 369/75.1 |
| 2004/0002018 A1* | 1/2004 | Oishi et al. | 430/270.13 |
| 2004/0126700 A1* | 7/2004 | Lee et al. | 430/270.15 |
| 2004/0136299 A1 | 7/2004 | Han | 369/53.26 |
| 2004/0137935 A1 | 7/2004 | Zarom | 455/550.1 |
| 2004/0242224 A1 | 12/2004 | Janik et al. | 455/426.1 |
| 2005/0078195 A1 | 4/2005 | VanWagner | 348/231.3 |
| 2005/0254367 A1 | 11/2005 | Volk et al. | 369/47.1 |
| 2006/0035707 A1 | 2/2006 | Nguyen et al. | 463/29 |
| 2006/0075342 A1* | 4/2006 | Penning | 715/704 |
| 2006/0121878 A1* | 6/2006 | Kelly et al. | 455/406 |
| 2006/0206582 A1 | 9/2006 | Finn | 709/217 |
| 2007/0079014 A1 | 4/2007 | Volk et al. | |

FOREIGN PATENT DOCUMENTS

WO    WO 2004/053868    6/2004

OTHER PUBLICATIONS

Patent Abstracts of Japan, vol. 2003, No. 01, Jan. 14, 2003 & JP 2002 281126 A (Ricoh Co. Ltd.), Sep. 27, 2002.

* cited by examiner

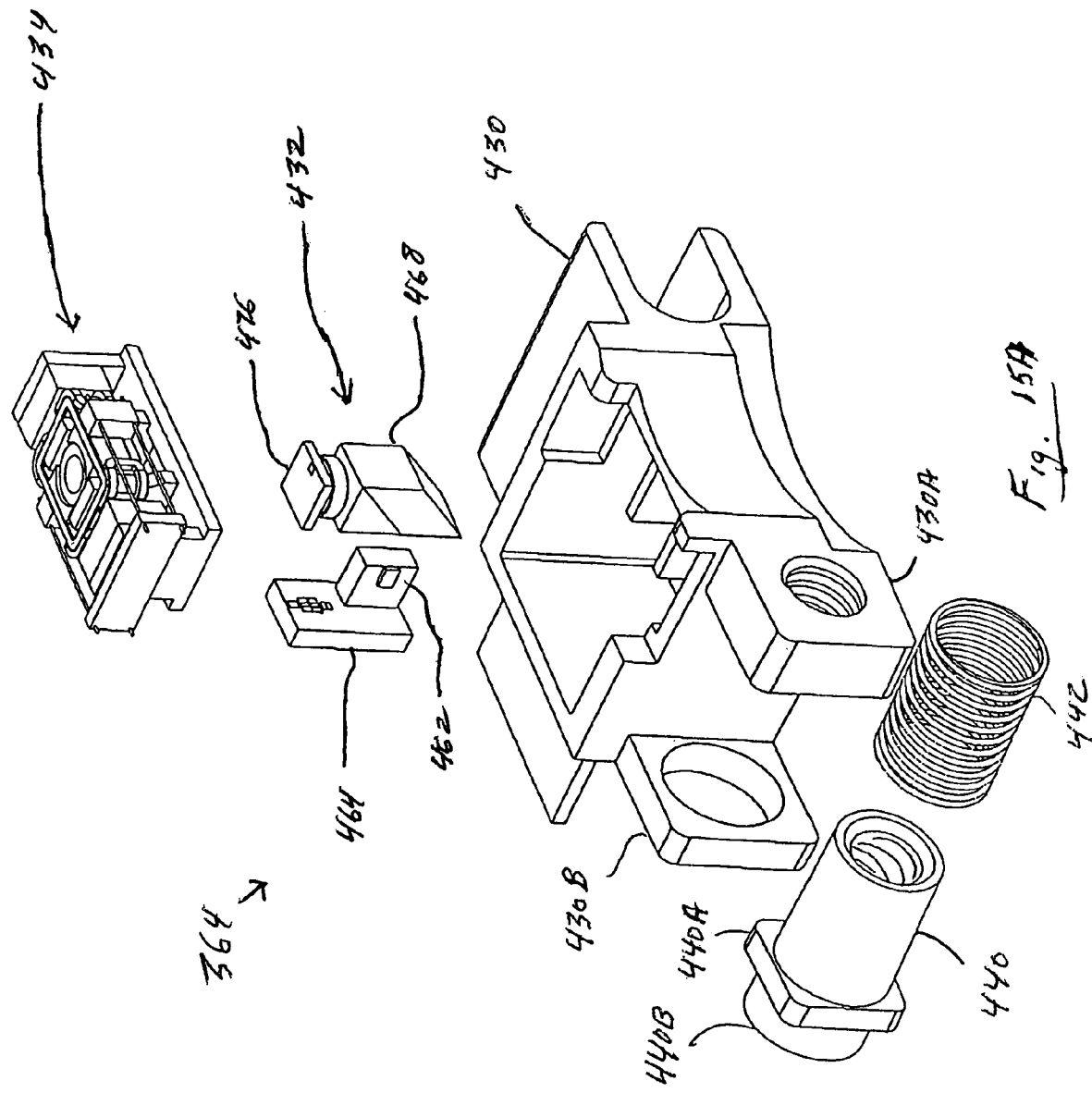

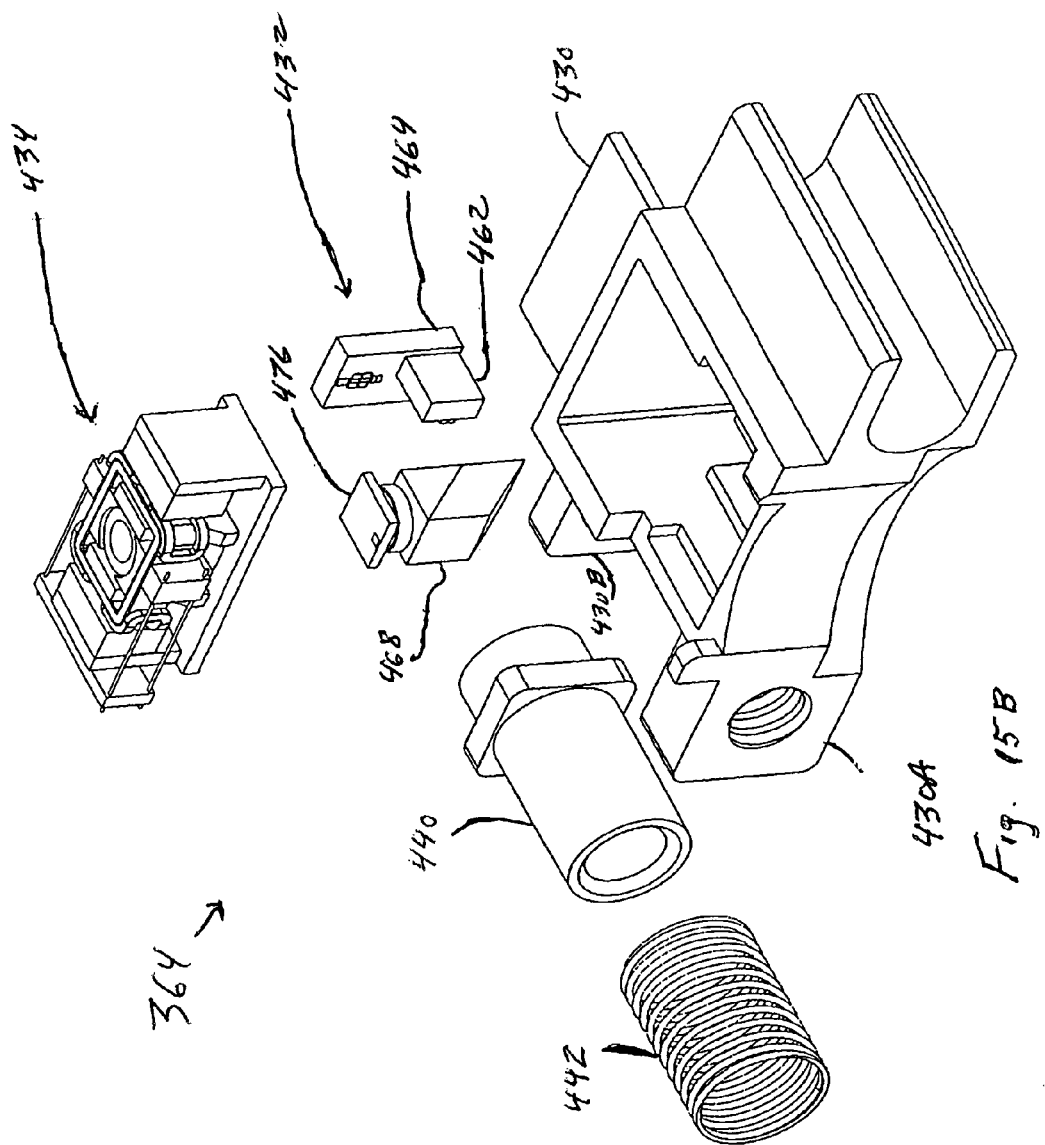

CELL PHONE OR OTHER PORTABLE HANDSET CONTAINING MICROMINIATURE OPTICAL DISC DRIVE

CROSS REFERENCE TO RELATED APPLICATIONS

This application is a continuation-in-part of application Ser. No. 10/423,701, filed Apr. 25, 2003, now U.S. Pat. No. 7,058,959 and of application Ser. No. 10/846,849, filed May 13, 2004, each of which is incorporated herein by reference in its entirety.

FIELD OF THE INVENTION

This invention relates to a microminiature optical disc drive and, in particular, to an optical disc drive that is small enough to be mounted into a cell phone or other comparably sized handset.

BACKGROUND

Consumer entertainment technologies are moving towards high resolution color displays for mobile entertainment. Increasingly, consumers want to take their entertainment with them. Cross-country travelers and cross-town commuters are eagerly pursuing gaming, music and video entertainment activities on cell phones, personal digital assistants (PDAs) and other kinds of handheld computers. At present, however, the entertainment experience is limited, even primitive, compared to what consumers have come to expect from their game consoles, home theaters and DVD-equipped computers.

The main problem is data storage. The fact is that sophisticated digital entertainment is data-intensive, and it is growing more so every day. Traditional small "form factor," portable media such as CompactFlash® cards, SD® flash cards, Memory Stick™ and other solid state memory devices simply cannot deliver the capacity and price per megabyte required for a high-quality entertainment experience. Recording content onto solid state memory cards in high volume is expensive and impractical, and securing that content effectively is very difficult.

While some experts predict that broadband Internet access will deliver high-quality games and movies to mobile consumer electronics devices, there are significant barriers to success. Cell phone networks are designed to transmit voice communications and are simply not efficient for high-capacity data transmission. Cell connections are not capable of the required speeds and are notoriously unreliable, with frequent dead zones and dropped connections. While games are being delivered to cell phones currently, the quality of game play and the game environment cannot begin to approach that of a console.

WiFi, or 802.11, wireless is designed for data transmission, and the growing number of WiFi hotspots looks attractive on the surface for delivering large amounts of data to mobile devices. Internet access and email application for multiple users are easily accommodated by WiFi. Nonetheless, managing streaming and interactive content such as multiplayer games and high-quality video or movies for thousands, if not millions, of users simultaneously will be challenging for any network. Security is also a problem for WiFi, leaving content providers open to potential piracy.

Moreover, the data storage problem would still exist. For any sort of networked delivery system to be viable, mobile consumer devices will have to embed significant amounts of storage to hold large, downloaded game and movie files, and to track a player's progress within the game. Perhaps the most significant problem for networked content delivery is cost. It has been estimated that it can cost more than $30 to send a DVD-quality film over the Internet.

Optical disc-based distribution costs are far lower. Even more compelling is the fact that consumers have consistently demonstrated their preference for purchasing high-value content on optical discs, as evidenced by the recent upswing in DVD sales. Moreover, optical discs are molded and can therefore be replicated at less expense than solid state memory devices.

Clearly, the mobile entertainment industry needs an economical, small form factor, secure storage technology to meet the growing demand for a portable, high-quality entertainment experience.

SUMMARY

In accordance with this invention, a microminiature optical disc drive is mounted in a cell phone or other portable handset. With a cell phone of this invention, the user may obtain an extremely high quality entertainment or other type of experience with a very small device that is routinely carried by a large percentage of the population. A cell phone of this invention can also be used as a wireless server to transmit a large volume of data to an external device such as a laptop computer.

The optical disc drive is manufactured to an extremely small form factor. For example, the disc drive may measure 49.90 mm×44.70 mm×14.90 mm. This is made possible principally by the use of a short-wavelength laser beam and high numerical aperture lens, which together facilitate the use of a high real density, removable optical ROM disk. This allows for a small diameter optical disc, which in turn permits the optical disc drive to be made very small. The robustness of the system is improved by housing the optical disc in a cartridge. The removability inherent in an optical disc drive (as compared for example, to a magnetic disc drive) makes it uniquely suitable for a system where it is desirable to vary the data content.

The run time of the optical disc drive is maximized by drawing power from battery in the cell phone or other host device, by reducing the power demands of the optical disc drive to almost zero when the disc drive is not in use, by compressing the data stored on the optical disc within the disc drive, and by using a buffer memory to receive data from the disc drive, thereby allowing the disc drive to "spin down" until the buffer memory needs to be refilled.

BRIEF DESCRIPTION OF THE DRAWINGS

FIGS. 15A and 15B are exploded views of the optomechanical carriage assembly taken from different angles.

DETAILED DESCRIPTION

Figure 1:
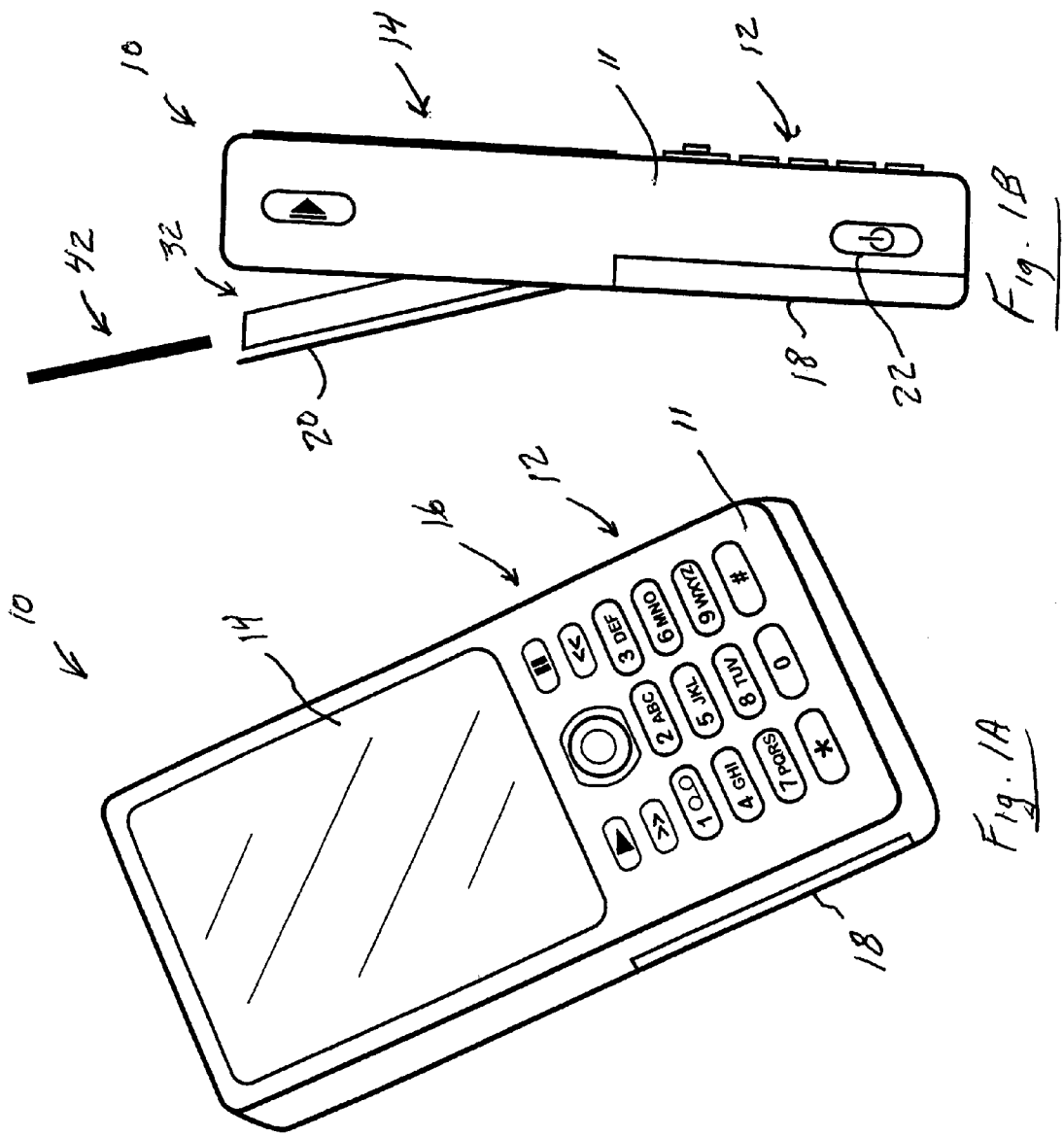
FIGS. 1A and 1B are external views of a cell phone in accordance with the invention.

FIGS. 1A and 1B are external views of a cell phone 10 in accordance with the invention. The components of cell phone 10 are enclosed in a housing 11, typically made of plastic. The front side of housing 11 supports a telephone keypad 12 and a video display 14. Between keypad 12 and display 14 is a set of disc drive controls 16, including, for example, "play," "fast forward," "pause" and "reverse" buttons. As shown in FIG. 1B, the back side of housing 11 includes a battery compartment access door 18 and an optical disc drive access door 20. When a disc eject button 22 is depressed, drive access door 20 and a cartridge load module 32 swing outward, allowing an optical disc cartridge 42 to be inserted into a cartridge load module 32.

It will be understood that housing 11 also contains components typical of a cell phone, such as a transmitter, receiver, microphone, speaker and control circuitry.

Figure 2:
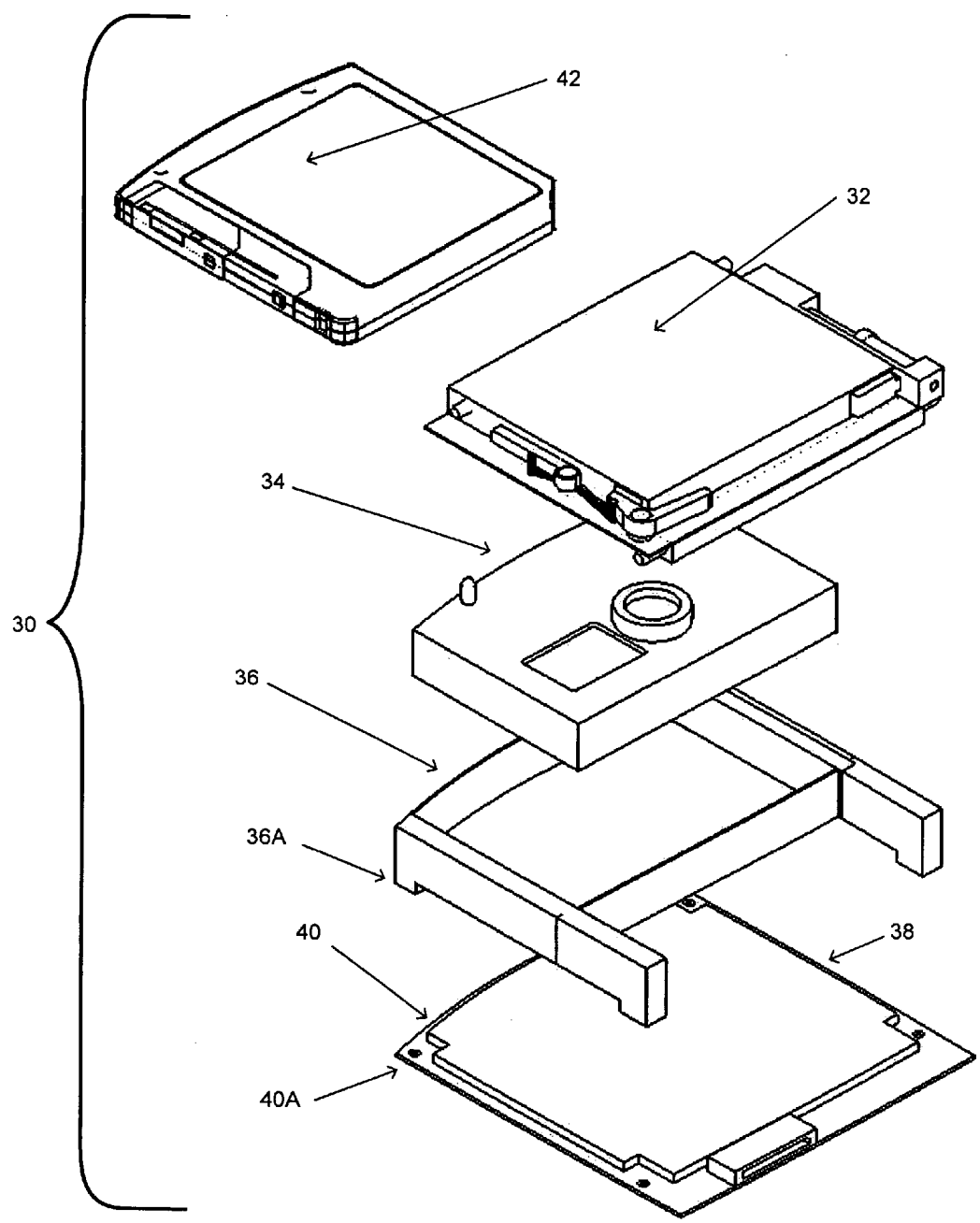
FIG. 2 is an exploded view showing the structure of the disc drive.
Figure 3:
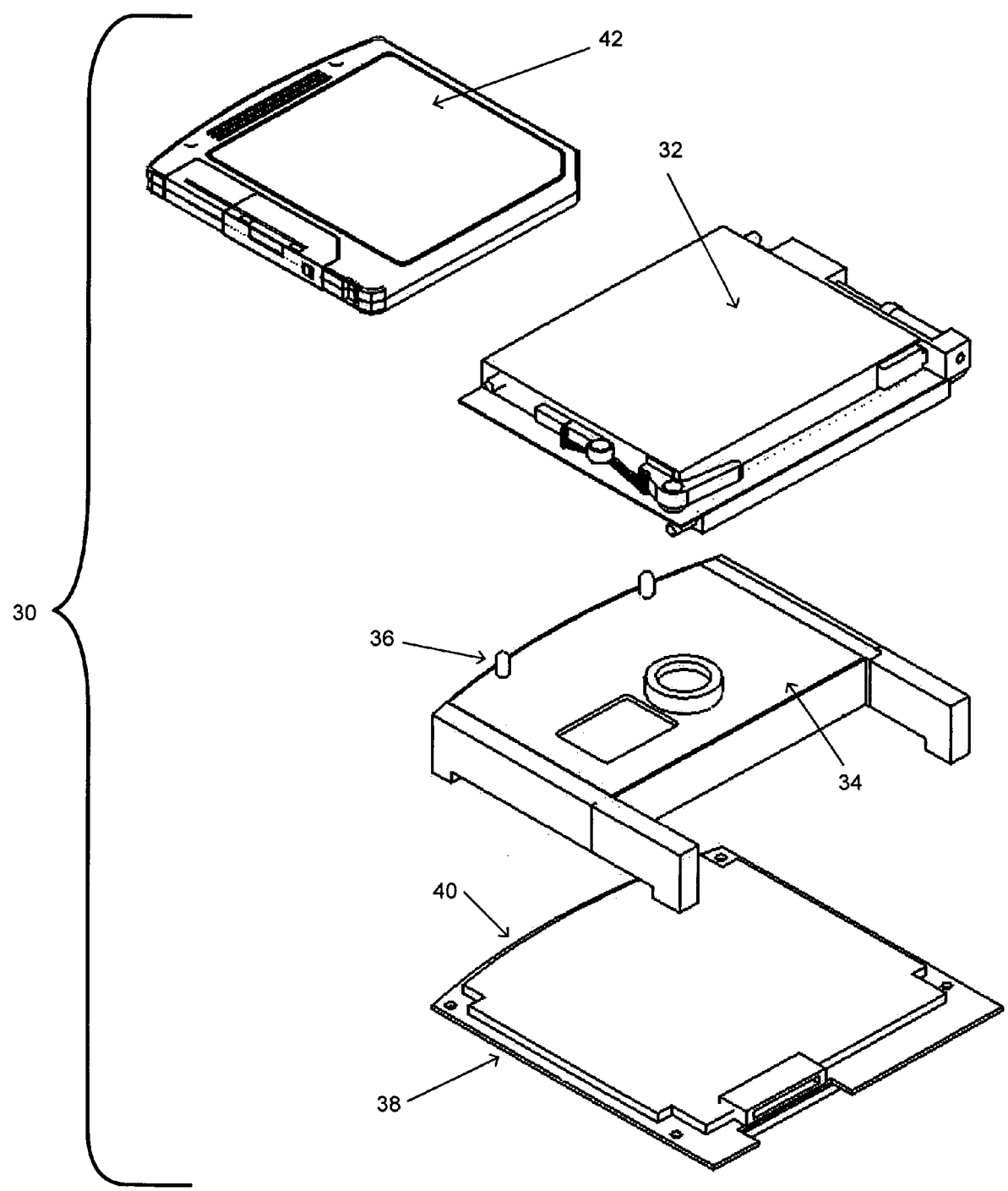
FIG. 3 is another exploded view showing how the optical drive module fits within housing.

FIG. 2 is an exploded view showing the structure of an optical disc drive 30. Optical disc drive 30 is mounted within housing 11, along with components of cell phone 10, below drive access door 20. An optical drive module 34 is mounted in an optical drive housing 36 above an optical drive PCBA 38. Optical drive module 34, optical drive housing 36 and optical drive PCBA 38 are held together by means of screws (not shown) that are threaded through holes 40A located near the corners of a bottom plate 40 and extend into optical drive housing 36. As shown, the corners of optical drive PCBA 38 are shaped to accommodate legs 36A of optical drive housing 36, thereby holding bottom plate 40 securely against optical drive housing 36. IC chips (not shown) that are part of the electronics used to drive optical drive module 34 are mounted on the top surface of optical drive PCBA 38. Cartridge load module 32 sits atop optical drive module 34. FIG. 3 is another exploded view showing optical drive module 34 mounted within optical drive housing 36.

In other embodiments, the housing of the cell phone could be of the hinged, "flip-open" variety, in which case the optical disc drive could be in one of the two hinged portions of the housing.

FIGS. 2 and 3 also show a cartridge 42, which contains an optical data storage disc. In various embodiments of this invention, cartridge 42 may take a variety of forms, but in one embodiment cartridge 42 is similar to the cartridge described in application Ser. No. 11/209,553, filed Aug. 22, 2005, entitled "Cartridge For Miniature Optical Data Storage Disc," which is incorporated herein by reference in its entirety. Cartridge 42 includes a shutter that moves from a closed position to an open position as cartridge 42 is inserted into cartridge load module 32. The optical disc within cartridge 42 must be small enough to maintain the miniature dimensions of disc drive 10. In one embodiment, the optical disc in cartridge 42 is 32 mm in diameter.

FIGS. 4 to 8 illustrate the loading of cartridge 42 into cartridge load module 32. As shown in FIGS. 4A and 4B, cartridge load module 32 includes a cartridge load sleeve 320, which in turn is formed of a base plate 322 and a cover 324.

Figure 4A:
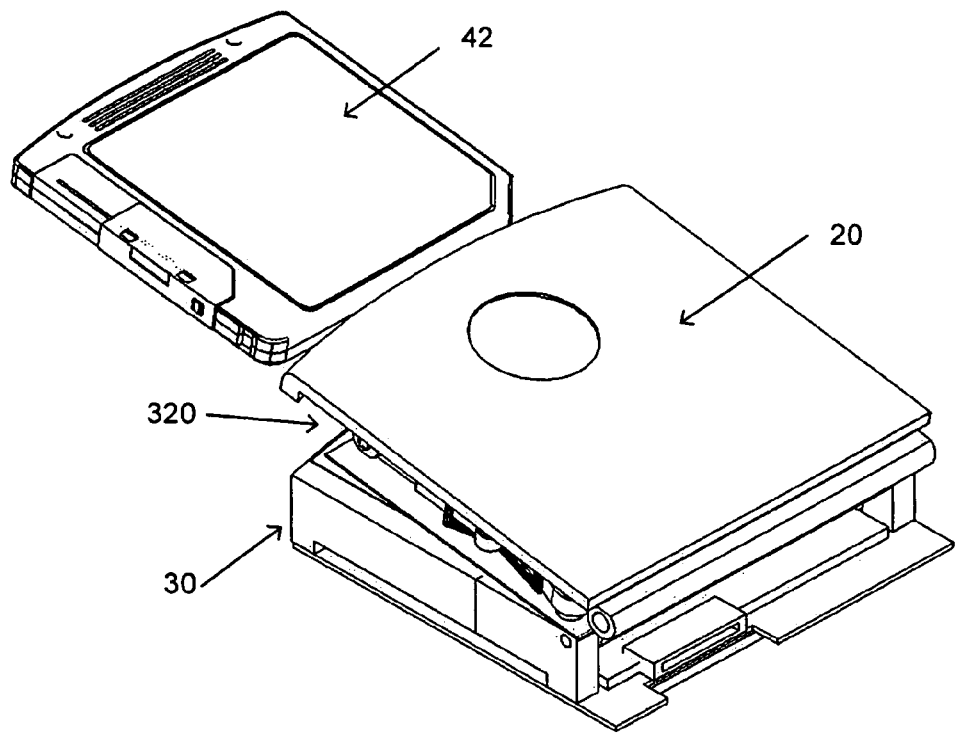
FIGS. 4A, 4B, 5A, 5B, 6A, 6B, 7A, 7B, 8A and 8B illustrate different stages in the process of loading the optical disc cartridge into the cartridge load module.
Figure 7A:
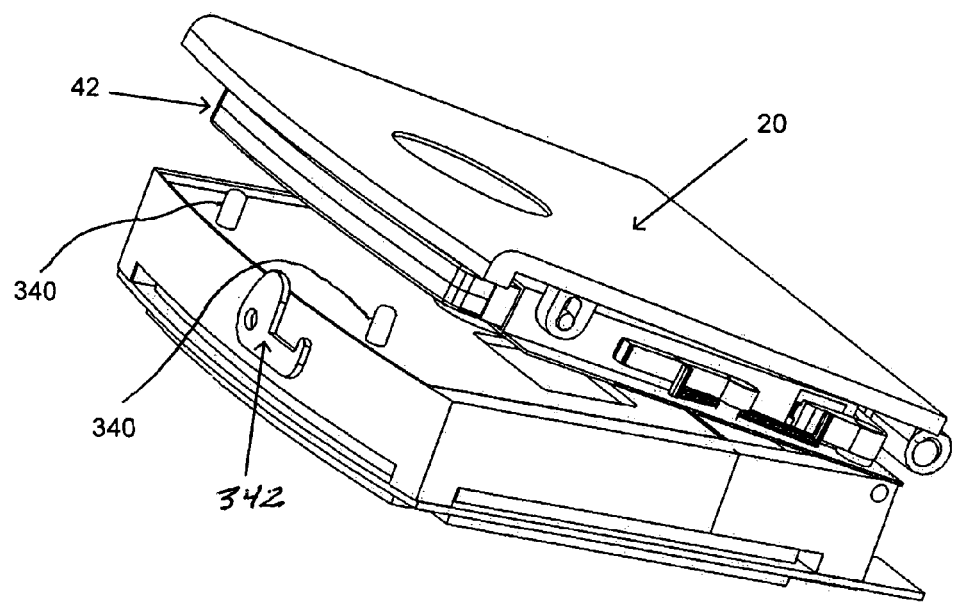
Figure 7B:
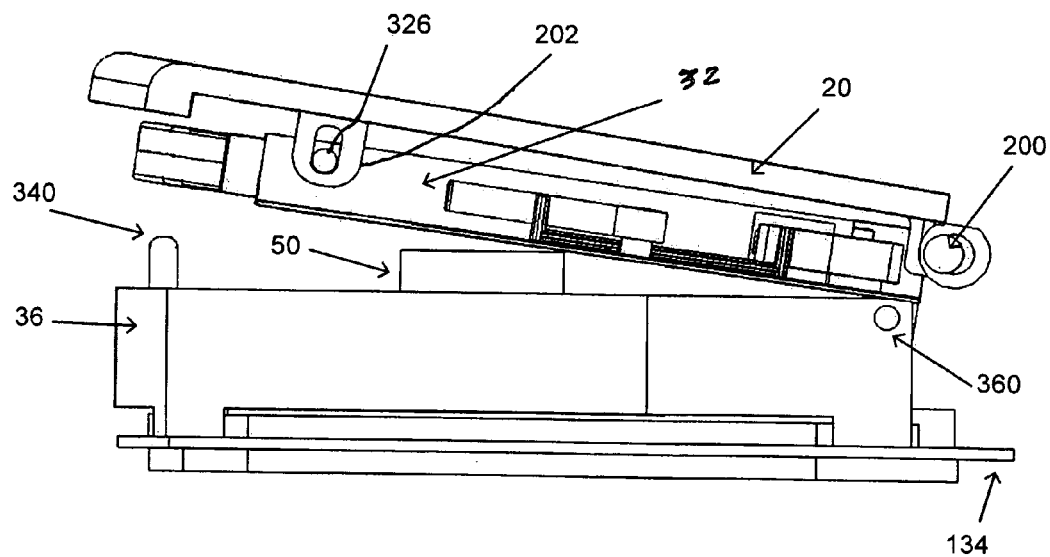

Initially, before cartridge 42 is loaded, drive access door 20 is in its closed position. To load cartridge 42, the user depresses disc eject button 22, which releases a latch. Since access door 20 is spring-biased towards the open position, releasing the latch causes drive access door 20 and cartridge load sleeve 320 to tilt upward, as shown in FIG. 4A. As shown in FIG. 7B, drive access door 20 pivots about a shaft 200, and cartridge load sleeve 320 pivots about a shaft 360 that is part of optical drive housing 36. A pair of slotted members 202 project downward on the underside of drive access door 20, and pins 326 project outward from the sides of cartridge load sleeve 320.

Figure 4B:
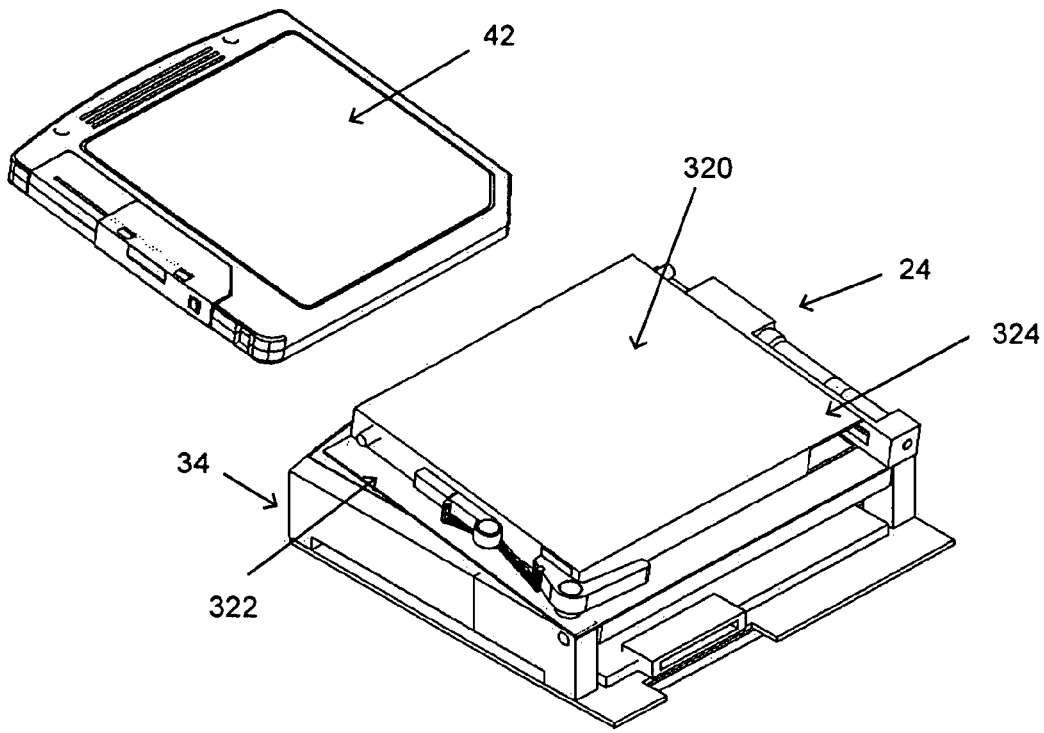

As drive access door 20 tilts upward, pins 326 slide in the slots of slotted members 202, exposing the entrance to cartridge load sleeve 320. Cartridge 42 can then be inserted into cartridge load sleeve 320. FIGS. 4A and 4B show cartridge 42 in the ready-to-load position, next to the entrance to cartridge load sleeve 320.

Figure 5A:
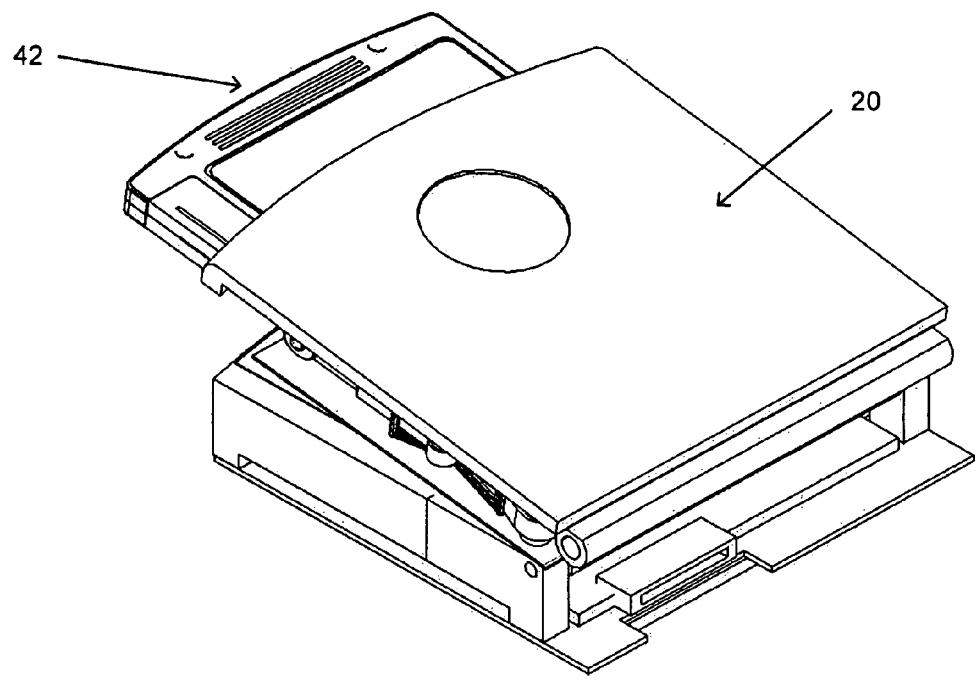
Figure 5B:
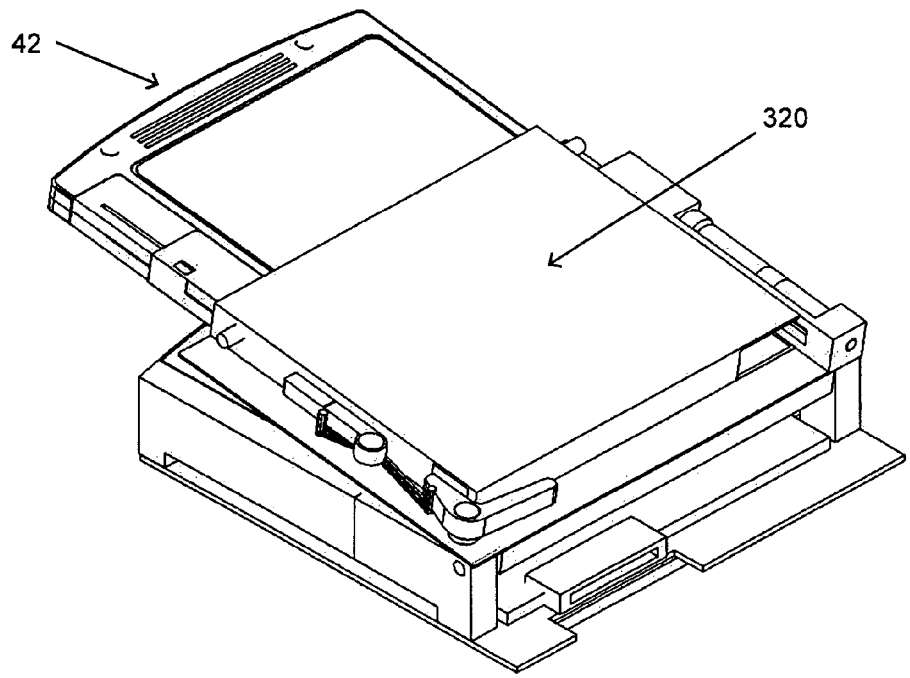
Figure 6A:
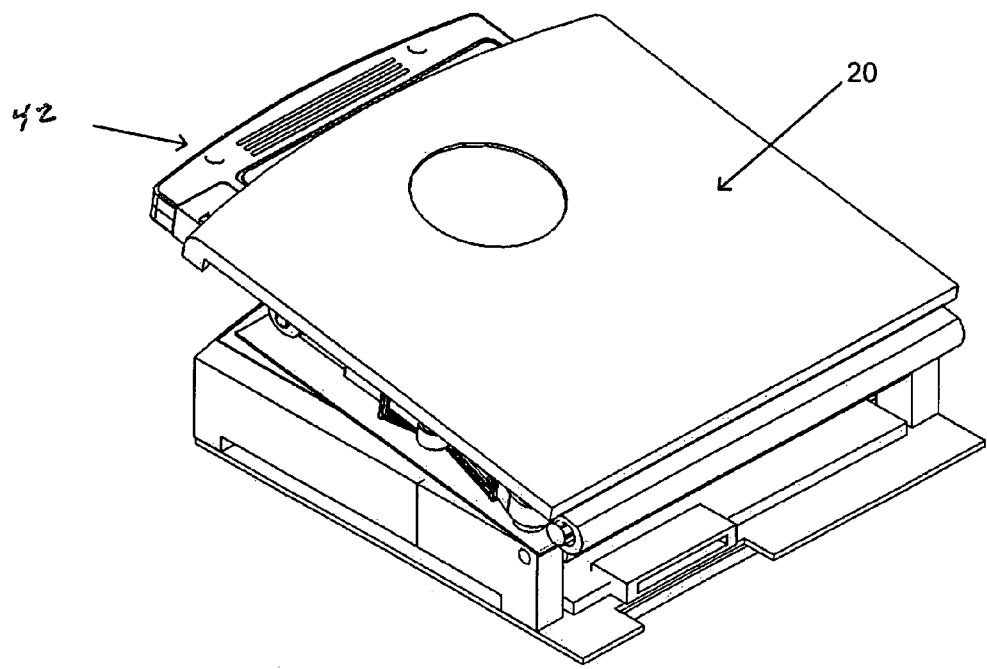
Figure 6B:
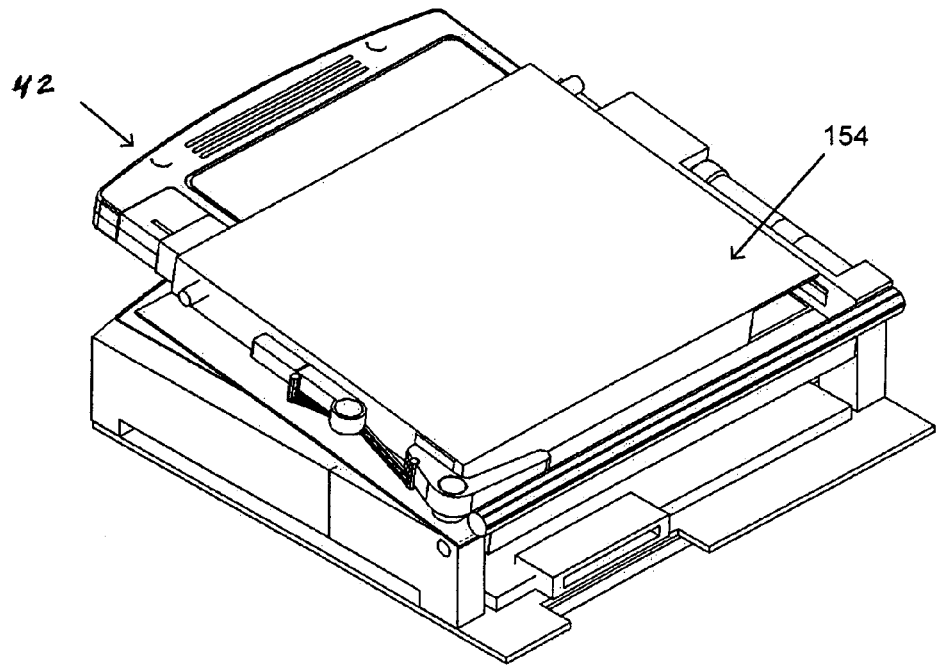

FIGS. 5A and 5B show cartridge 42 partially inserted into cartridge load sleeve 320. FIG. 5B is taken with drive access door 20 removed. FIGS. 6A and 6B show the arrangement after cartridge 42 has been inserted slightly further, and FIGS. 7A and 7B show cartridge 42 after it has been fully inserted into cartridge load sleeve 320 with drive access door 20 is still open. In this position, the shutter in cartridge 42 has been fully opened, exposing a portion of the optical disc. Registration pins 340 project upward from optical drive module 34 to engage registration holes in cartridge 42 when drive access door 20 is closed, firmly and properly positioning cartridge 42 for reading the data stored on the disc. A spindle assembly 50 (described below) extends upward from optical drive module 34, ready to engage a central hole of the disc.

Figure 8A:
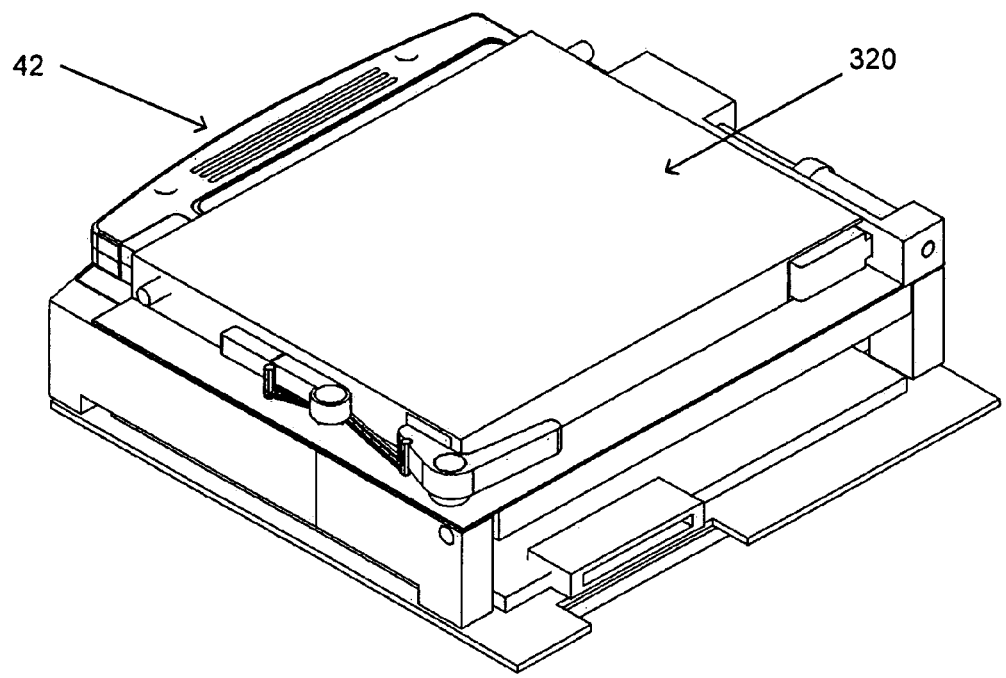
Figure 8B:
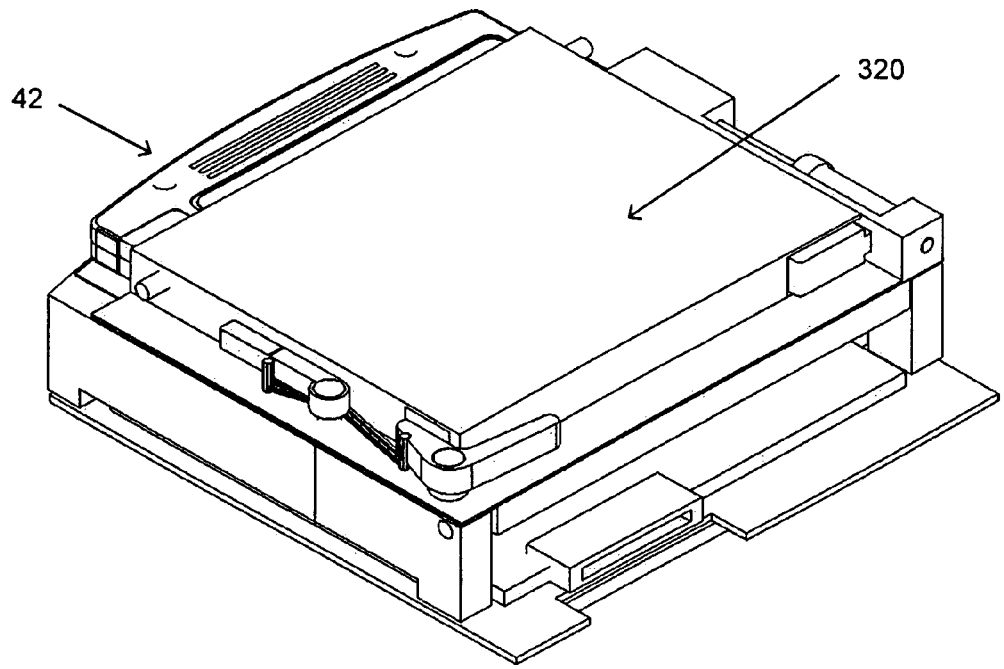

After cartridge 42 has been fully inserted in cartridge load sleeve 320, as shown in FIGS. 7A and 7B, the user presses downward on drive access door 20, engaging a latch 342 which snaps into a locked condition when drive access door 20 is fully closed. The pivot spring that biases drive access door 20 is cocked so that it will open drive access door 20 the next time that the latch is released. The situation at this point is shown in FIGS. 8A and 8B, which are taken with drive access door 20 removed.

To remove cartridge 42, the user disc depresses eject button 22, which releases the internal latch. The pivot spring opens drive access door 20, which via slotted members 202 lifts cartridge load sleeve 320 upward, disengaging cartridge 42 from registration pins 340 and the optical disc from spindle assembly 50. Cartridge 42 is then free to be removed from cartridge load module 32.

FIGS. 9-21 illustrate the structure of optical drive module 34.

Figure 9:
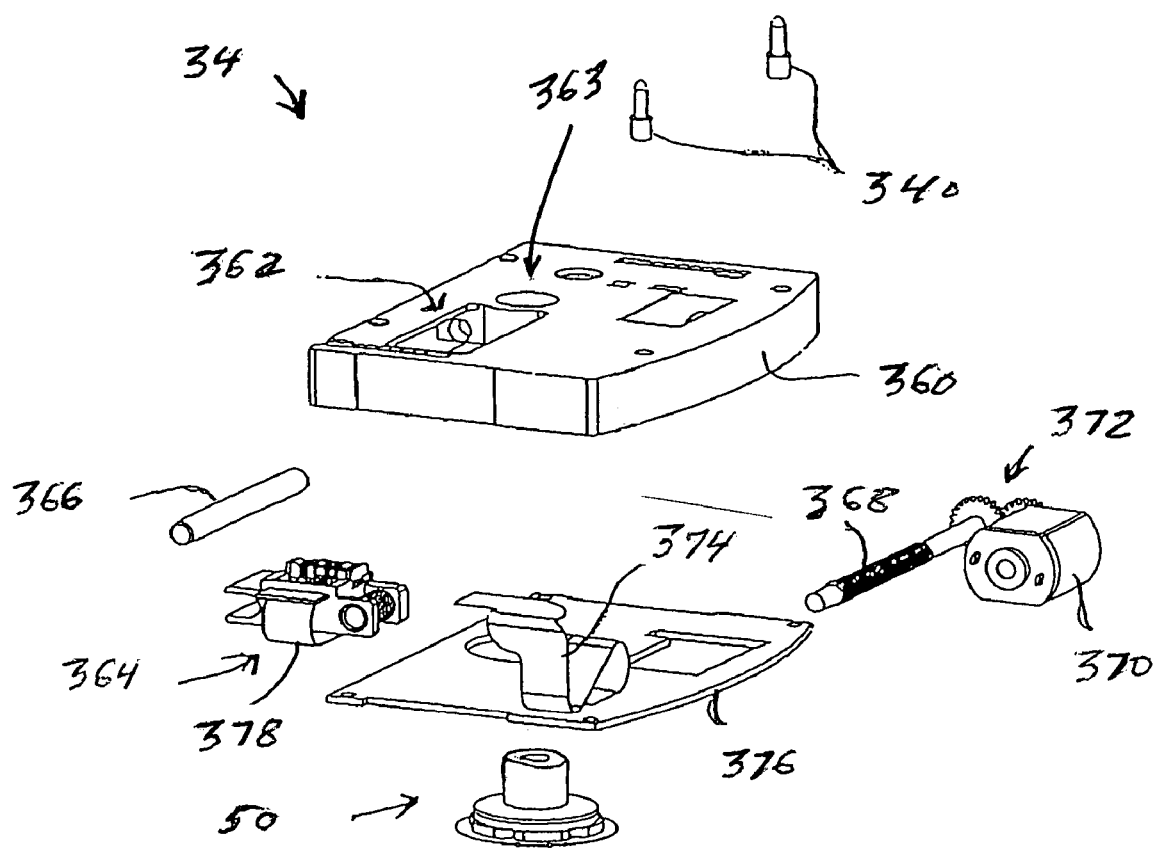
FIG. 9 is an exploded view of the optical drive module.

Referring to FIG. 9, the components of optical drive module 34 are mounted in a body member 360, which can be made of a metal such as aluminum or magnesium or a plastic resin such as a liquid crystal polymer having a Young's modulus of at least $2.8 \times 10^4$ MPa ($4.4 \times 10^6$ psi). A data access opening 362 is formed in body member 360. Optical drive module 34 contains spindle assembly 50 and an optomechanical carriage assembly 364, which slides along a rail 366. Spindle assembly 50 engages the central hole of the optical disc through an aperture 363 in body member 360. As described below, optomechanical carriage assembly 364 contains a laser diode, a lens and other components for reading data from the optical disc through data access opening 362.

Also shown in FIG. 9 is a lead screw 368 that is used to provide coarse positioning for the laser beam that emanates from optomechanical carriage assembly 364. Lead screw 368 is driven by a carriage drive (coarse tracking) motor 370 through a two-stage gear reduction unit 372. Anti-backlash gears may be used in the drive train. The bearing elements for lead screw 368 preferably contain at least one pre-loaded pair of ball bearings to keep friction low, but eliminate backlash in the motion of lead screw 368 along its axis of rotation. A flexible interconnect 374 connects optical drive PCBA 38 (FIG. 2) to a PCBA 376, which forms the floor of optical drive module 34, and a flexible interconnect 378 connects PCBA 376 to optomechanical carriage assembly 364. ZIF connectors on either or both of PCBAs 38 and 376 may be used to facilitate assembly.

To service the motion of optomechanical carriage assembly 364 along the tracking path (parallel to rail 366 and lead screw 368), flexible interconnect 378 forms a single loop between the tail of carriage assembly 364 and PCBA 376. The carriage end of flexible interconnect 378 is connected to a laser/detector package for signal and data transfer, and to a fine servo motor to control focus and tracking. In an implementation using a linear motor, it would also carry the coarse motor current. Again, a ZIF connector on the PCBA 376 can be used to facilitate assembly.

A short flexible interconnect (not shown) may be used to connect coarse tracking motor 370 to PCBA 376, although discrete wires or formed motor terminals could also be used.

Figure 10:
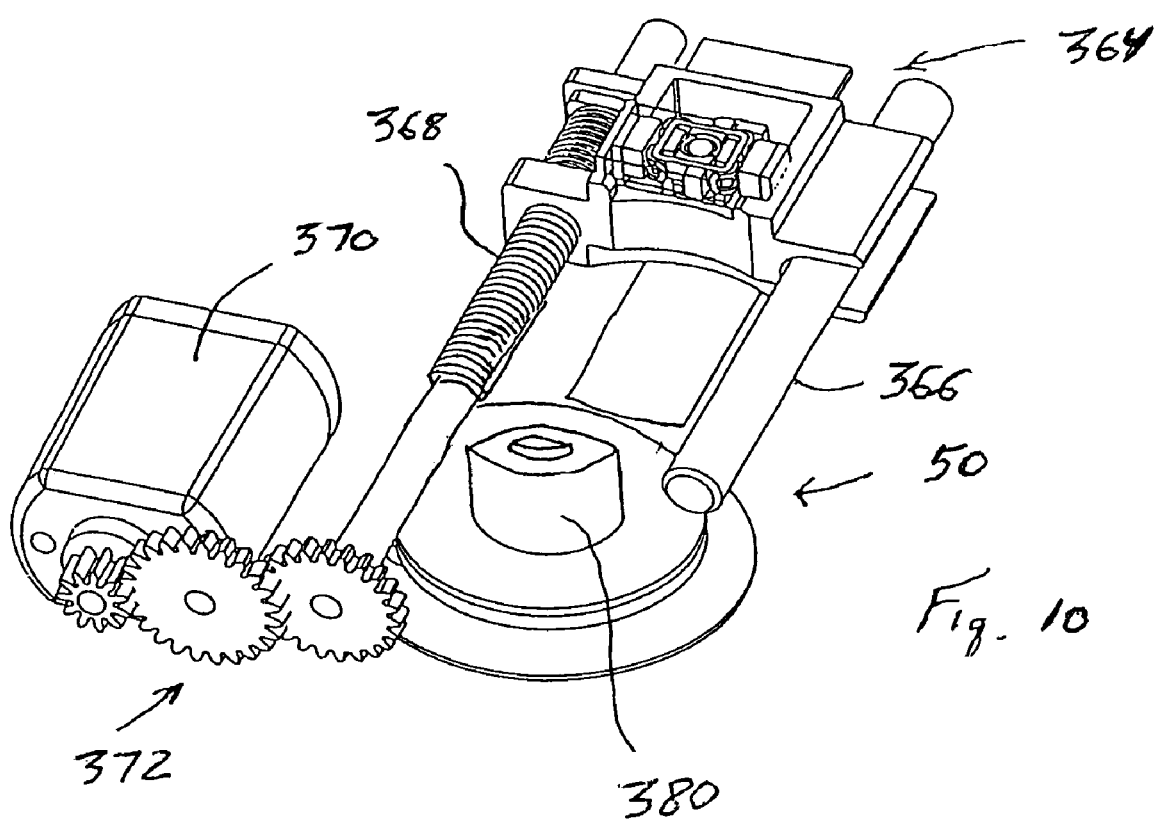
FIG. 10 is an exploded view of the coarse tracking mechanism and the spindle assembly.

The coarse tracking mechanism and spindle assembly 50 are shown in greater detail in FIG. 10. Coarse tracking motor 370 can be a brush-type, reversible DC motor, such as a Canon model DN06-V*N*B, although a stepper motor or brushless DC motor could also be used. Among the factors that determine the choice of motor are bandwidth, power consumption, cost, reliability and durability.

Lead screw 368 and optomechanical carriage assembly 364 may be coated with or made from materials which mitigate the friction inherent in this type of actuator. Materials such as polytetrafluoroethylene (PTFE) or molybdenum disulfide can be used as a coating for threaded elements, and added to molding resins to optimize the tribology between lead screw and nut of such a driver. This can also reduce power consumption and improve servo response.

Coarse tracking motor 370 moves in response to a signal derived from a position sensor on the fine tracking motor (described below). The fine tracking motor follows the tracks on the optical disc, including disc runout, and accomplishes small seek movements. However, when the fine tracking motor is away from its center position by a specified average amount, lead screw 368 will be turned to advance or retract the optomechanical carriage assembly 364 to a position near the center of the fine tracking motor travel. The two-stage spur gear reduction unit 372 allows the use of a small, low current motor. Other gear reduction schemes could also be used, but spur gears are low cost and high efficiency. The gears in gear reduction unit 372 correspond roughly to 120 diametral pitch gears, but they could also be special pitch or metric module gears. The gear reduction unit may also contain anti-backlash gears.

Figure 11:
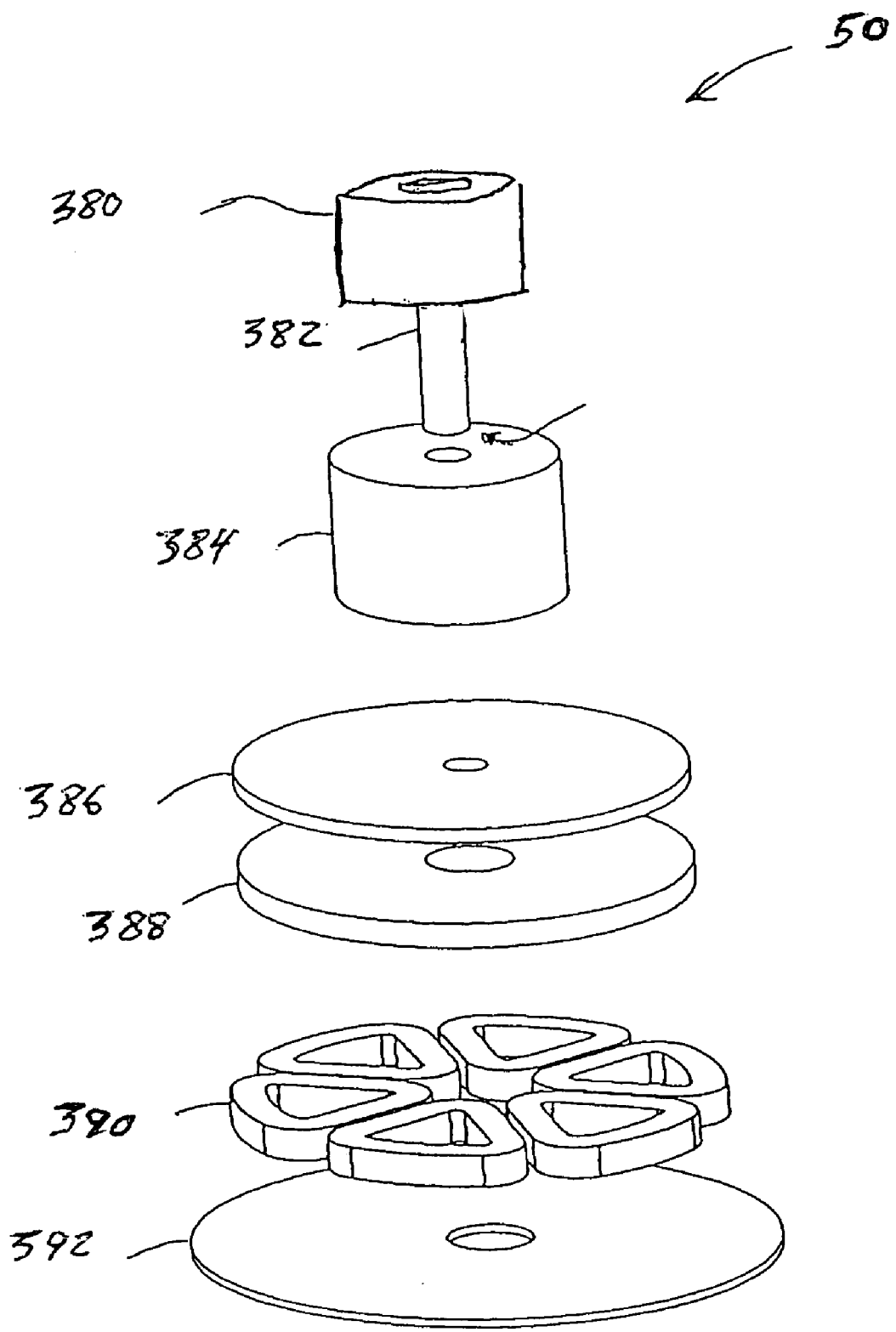
FIG. 11 is an exploded view of the spindle assembly.

FIG. 11 is an exploded view of spindle assembly 50, including a spindle chuck 380, a spindle shaft 382, a spindle bearing/bushing 384, a backing plate 386, a spindle rotor magnet 388, stator coils 390 and a stator plate 392.

Stator coils 390 and stator plate 392 are both glued to PCBA 376 (see FIG. 9). Stator coils 390 are a standard brushless multi-phase drive for spindle rotor magnet 388, which is magnetized in "pie-slice" shaped segments through its thickness in the axial direction. The north-south orientation of the magnetic material is in the same direction. The magnetic material is preferably a barium ferrite ceramic, but it could be any of several others, including a rare-earth composite or hard magnetic material, such as neodymium-iron-boron, samarium cobalt, etc.

Figure 12A:
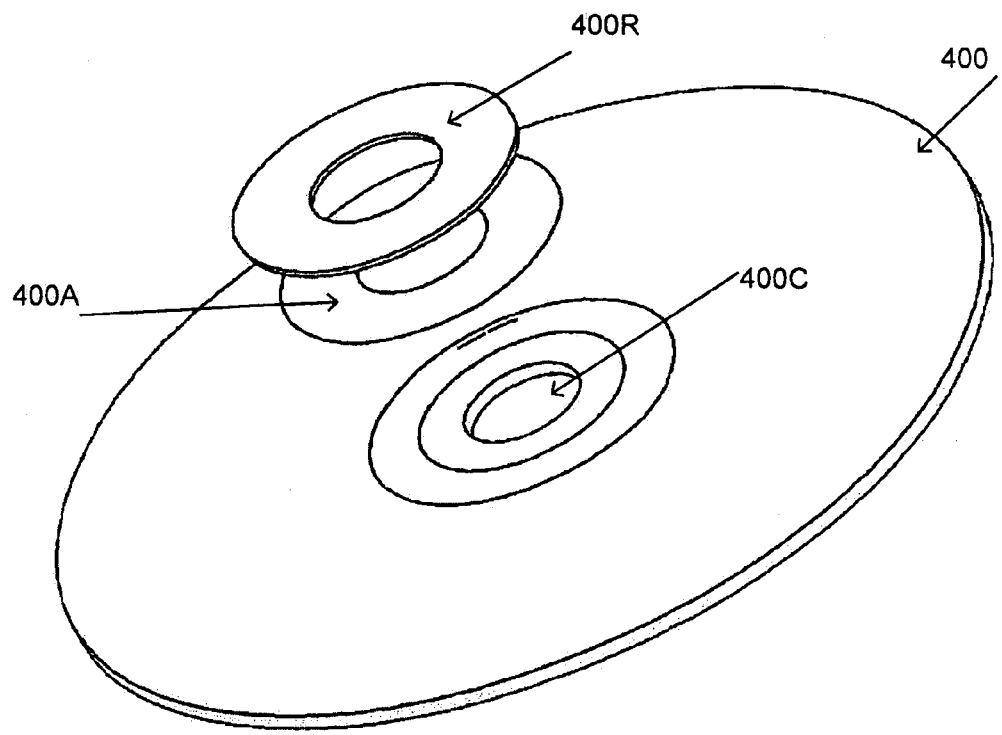
FIG. 12A is an exploded view of the optical disc.

FIG. 12A is an exploded view of an optical disc 400 that is housed inside cartridge 42, showing a magnetic retention ring 400R and a pressure-sensitive adhesive ring 400A, which bonds magnetic retention ring 400R to optical disc 400. Alternatively, magnetic retention ring 400R can be glued to disc 400. Also shown is the central hole 400C of disc 400. Magnetic retention ring 400R is made of a magnetic material such as plated steel or magnetic stainless steel, and is bonded to the non-data side of disc 400 around central hole 400C. Magnetic retention ring 400R could be 0.2 mm thick and 8-9 mm in diameter, for example. Further details of disc 400 are contained in the above-referenced application Ser. No. 11/209,553.

Figure 12B:
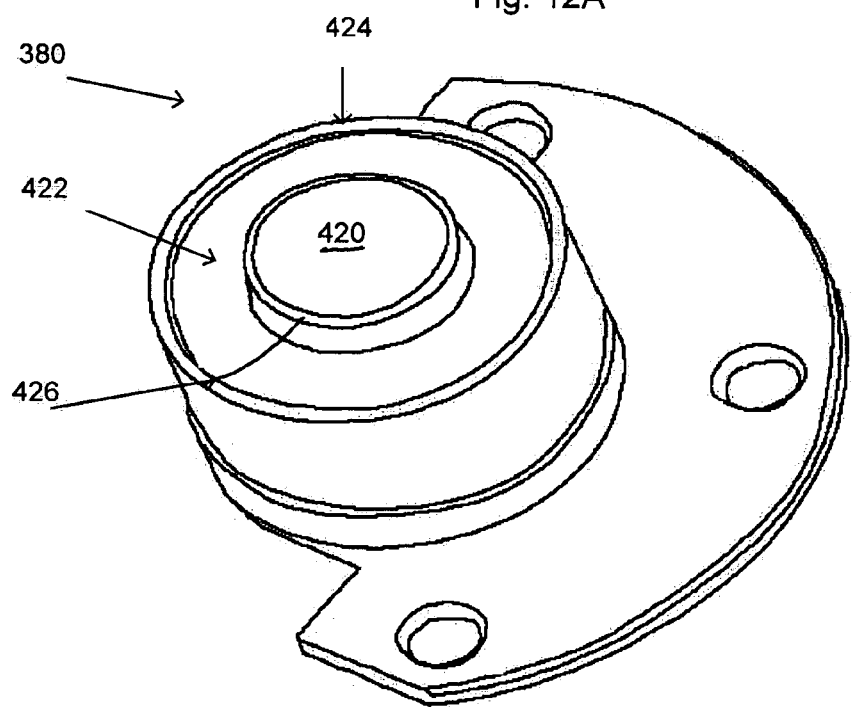
FIG. 12B shows the structure of the spindle chuck.

FIG. 12B shows the structure of spindle chuck 380. Spindle chuck 380 includes a spindle pin 420, which is surrounded by a magnet 422 and a circular platen 424. Magnet 422 is magnetized with multiple pie-shaped magnets having their poles parallel to the axis of spindle chuck 380. Half of the north poles and half of the south poles are oriented in the same direction. For example, if there are eight magnets, four north poles and four south poles would face in the same direction, with the north and south poles alternating. A greater number magnets provide a greater retention force when disc 400 is fully mounted on spindle chuck 380, but the magnetic lines of force are more concentrated and the "reach" of the magnetic field is therefore less than with a fewer number of magnets.

Figure 13A:
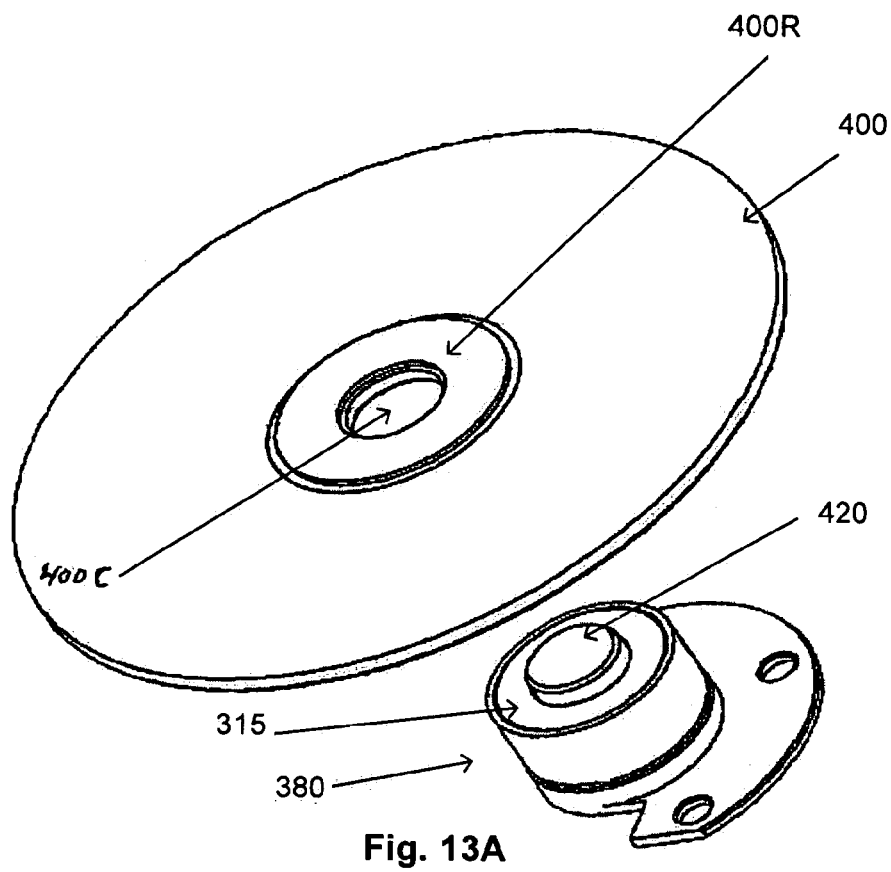
FIGS. 13A and 13B show the optical disc approaching and mounted on the spindle chuck, respectively.
Figure 13B:
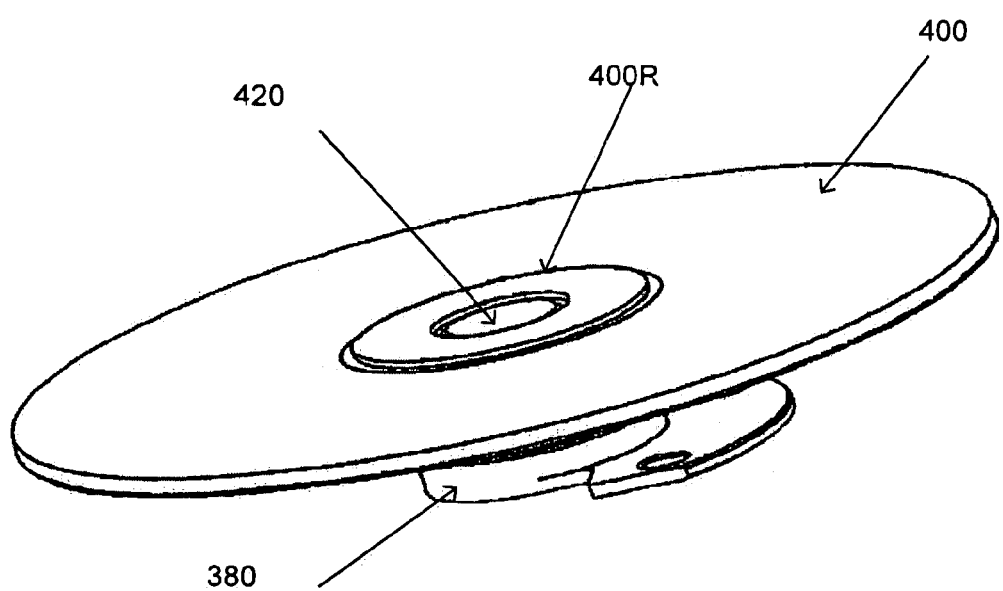

FIGS. 13A and 13B show disc 400 approaching and mounted on spindle chuck 380, respectively. When disc 400 is mounted on spindle chuck 380 (FIG. 13B) spindle pin 420 protrudes into the central hole 400C of disc 400, and the force between magnet 422 and magnetic retention ring 400R (through the thickness of disc 400) presses the data side of disc 400 flat against circular platen 424. Spindle pin 420 is a close fit (e.g., within 0.05 mm) to central hole 400C, so that disc 400 is precisely centered on spindle chuck 380. To allow for some eccentricity of disc 400 as it approaches spindle chuck 380, the nose of spindle pin 420 is formed with a chamfered surface 426, as shown in FIG. 12B.

Thus, referring again to FIG. 13B, as cartridge 42 is lowered onto spindle assembly 50, the lines of force of magnet 422 interact with magnetic retention ring 400R and draw disc 400 onto spindle chuck 380. This action tends to compress adhesive ring 400A. Magnetic retention ring 400R should be centered accurately enough with respect to central hole 400C so as not to interfere with the projection of spindle pin 420 into central hole 400C (typically to a tolerance of 2 mm).

Figure 14:
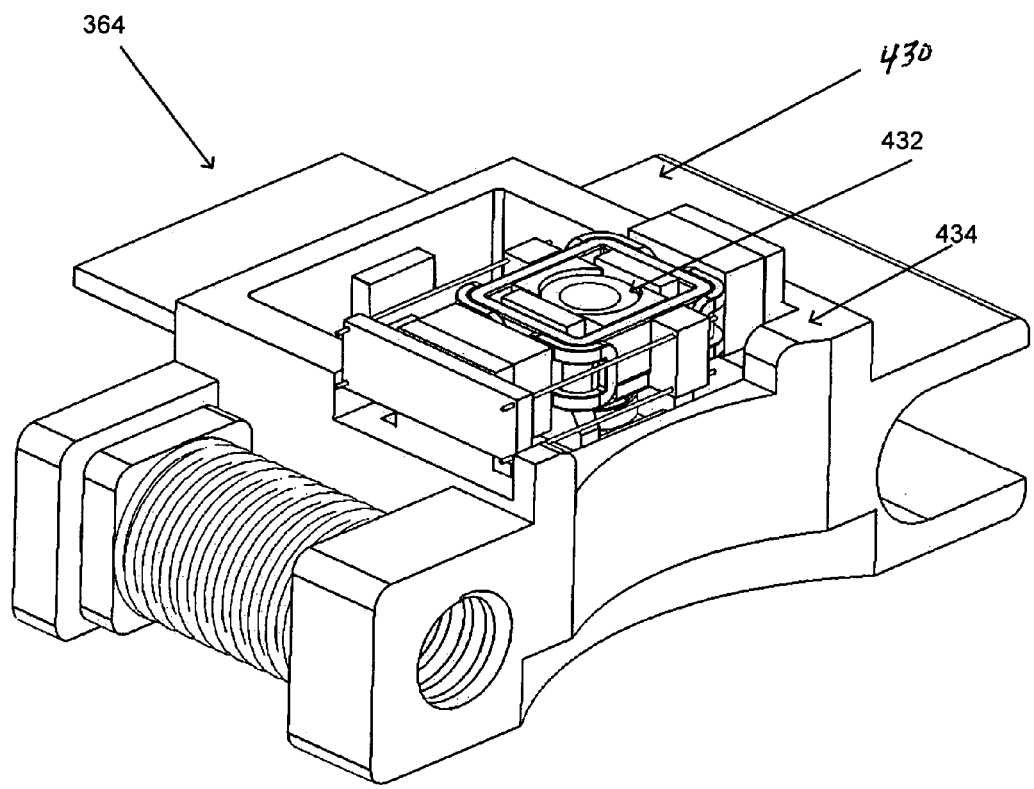
FIG. 14 is a general view of the optomechanical carriage assembly.

FIG. 14 is a general view of optomechanical carriage assembly 364, and FIGS. 15A and 15B are exploded views of optomechanical carriage assembly 364 taken from different angles. Optomechanical carriage assembly 364 includes a carriage body 430, an optics assembly 432, and a fine tracking/focus mechanism 434. Carriage body 430 can be a molded/cast part. Carriage body 430 supports elements of optics assembly 432 and attachments for flexible interconnect 378 (FIG. 9) and provides the guided surfaces for the motion of carriage assembly 364 along the tracking path. Carriage body 430 is coupled via lead screw 368 to coarse tracking motor 570. Carriage body 430 also absorbs heat from the electronics, laser diode, and servo motors. It may be made of materials which reduce friction so that in some embodiments the female threaded element that meshes with lead screw 368 can be molded directly into carriage body 430.

Optics assembly 432, which is described in greater detail below, includes a laser diode, servo detectors, beam distribution and splitting prisms, collimation and objective lenses, a wave retardation plate, a reflective position flag, and a reflective power monitoring surface. In addition, some of the detectors may be mounted on substrates which also include signal amplification electronics.

Fine tracking/focus mechanism 434, also described below, includes shared magnetic circuits and five coils that together comprise a two-axis voice coil motor used to position the readout objective lens (which is also part of optics assembly 432).

Also shown in FIGS. 15A and 15B are an anti-backlash mechanism that includes a threaded sleeve 440 and a compression spring 442. Carriage body 430 includes a first flange 430A which contains a threaded aperture that, as noted above, meshes with lead screw 368, and a second flange 430B that contains an unthreaded aperture. The central aperture of sleeve 440 is likewise threaded to mesh with lead screw 368. Sleeve 440 is installed between flanges 430A and 430B with a round end 440B projecting into the hole of flange 430B and with compression spring 442 enclosing sleeve 440 and butting against flange 430A and a shoulder 440A of sleeve 440. When lead screw 368 is threaded into flange 430A and sleeve 440, compression spring 442 exerts a gentle outward pressure against flange 430A and sleeve 440. This prevents any slack or lost motion between optomechanical carriage assembly 364 and lead screw 368.

Figure 16:
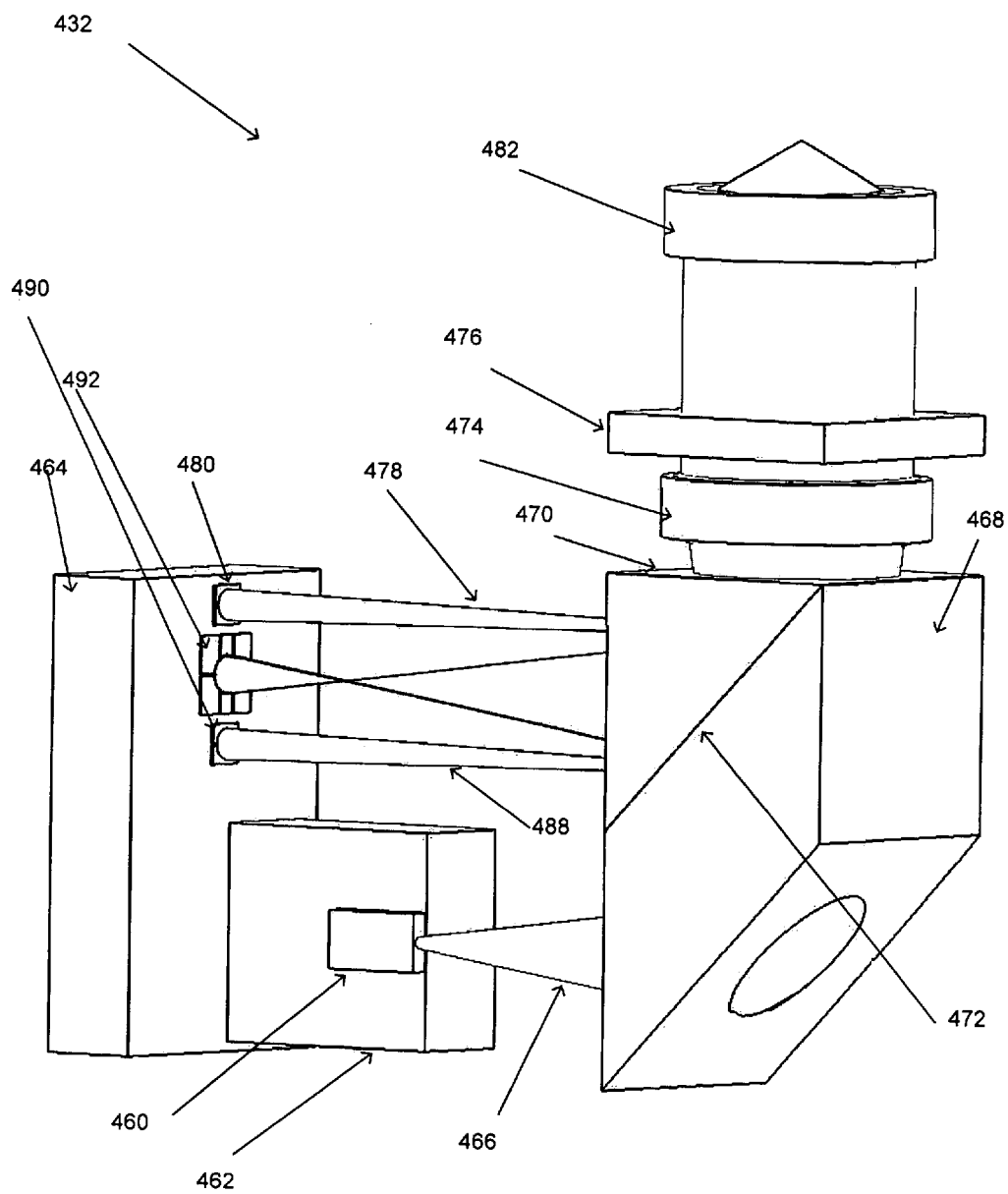
FIG. 16 is a schematic view of the optics assembly.

FIG. 16 illustrates a schematic view of optics assembly 432. For purposes of this description, the terms "up," "down," "above" and "below" are used in relation to FIG. 16.

The laser beam originates in a laser diode 460. Laser diode 460 preferably provides a blue laser beam with a wavelength of 405 nm or less. Laser diode may be a Cree model 405LD 500 or a Sanyo model LS5000. Use of a 405 nm blue laser beam permits the track pitch on optical disc 400 to be reduced to 0.39 µm from the pitch of 0.74 µm required for a typical red laser beam used in DVD systems, for example, which has a wavelength in the range of 600-700 nm. This approximately doubles the volume of data that can be stored on disc 400.

Laser diode 460 is mounted on a heat sink 462 near the bottom of a laser diode/detector substrate 464. A 405 nm laser beam 466 emanates from laser diode 460 as a diverging, elliptical cone of light. Laser beam 466 enters a rhombic prism 468 and is directed upward by internal reflection in prism 468.

Rhombic prism 468 is attached to a half cube 470. A diagonal surface between the rhombic prism 468 and half cube 470 is coated with a polarization sensitive layer, which forms a beam-splitting interface 472. The predominant polarization of laser beam 466 causes it to pass through beam-splitting interface 472 and continue upward. After laser beam 466 leaves half cube 470, it enters a collimating lens 474. Collimating lens 474 converges laser beam 466 just enough to make the beam a collimated (parallel ray) beam. Above collimating lens 474 is a quarter-wave retardation plate 476, having its optical axis oriented at 45 degrees to the incident polarization of laser beam 466. After the light passes through the quarter-wave plate 476, it is circularly polarized.

Figure 17:
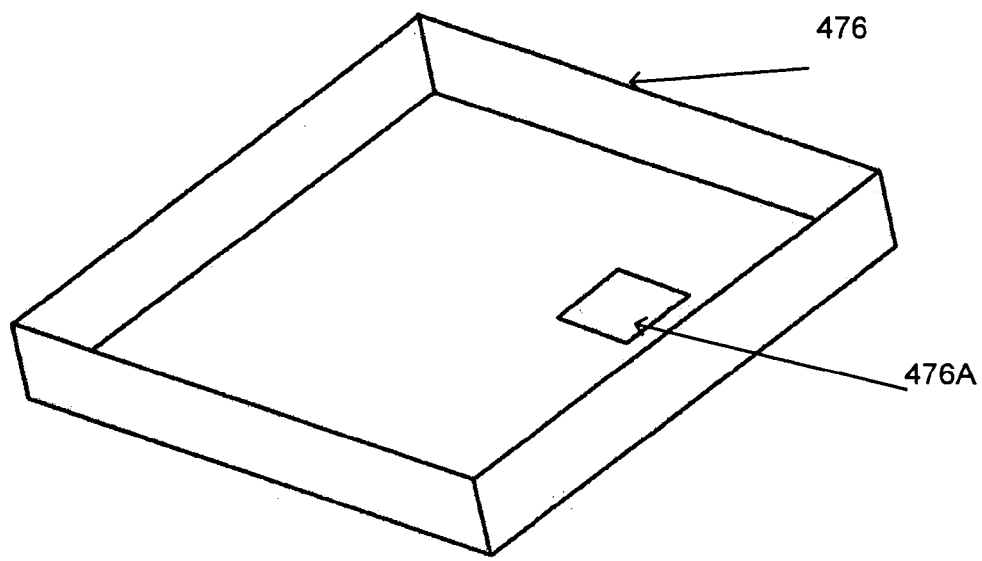
FIG. 17 shows the quarter-wave plate in the optics assembly.

On the upper surface of quarter-wave plate 476, shown in FIG. 17, is a small silvered area 476A, which reflects a portion of the upward bound laser beam 466 back through quarter-wave plate 476. That reflected "beamlet" is converted to linear polarization after passing through quarter-wave plate 476, such that its polarization is now rotated 90 degrees from the polarization of laser beam 466 when it left collimating lens 474. When this "beamlet" encounters beam-splitting interface 472, it is now reflected instead of transmitted. This reflected "beamlet", shown at 478 in FIG. 16, is directed to a photodetector 480 on substrate 464, where it is used to modulate the laser power control loop.

The remainder of the outbound beam (minus the "beamlet") proceeds upward towards an objective readout lens 482, which is supported by an objective lens mount 484, shown in FIG. 18 from below.

Figure 18:
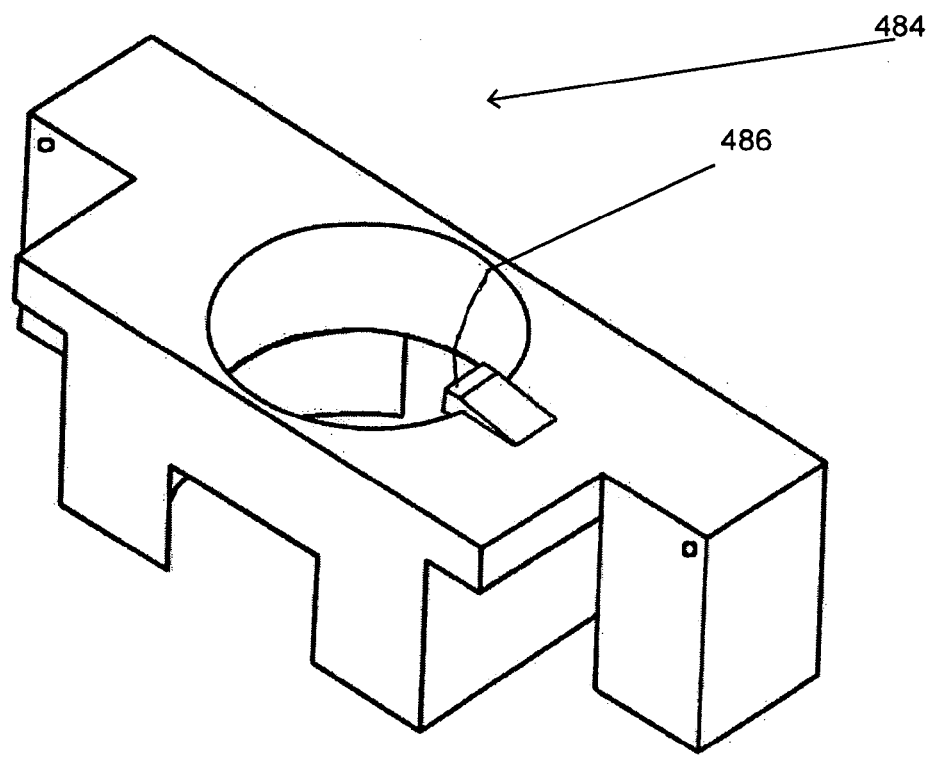
FIG. 18 shows the objective lens mount in the optics assembly.

As shown in FIG. 18, protruding from objective lens mount 484 is small, shaped reflective element 486, which returns another portion of laser beam 466. Reflective element 486 may be made of metal, and may be added to lens mount 484, or it may comprise a reflective coating applied to a molded plastic feature. Its reflective surface may be planar or curved.

The portion of laser beam 466 that is reflected from reflective element 486 is reflected in a direction that is determined by the position of lens mount 484 along the "tracking axis." The "tracking axis" of lens mount 484, described further below, nominally coincides with the axis along which laser beam 466 is reflected upward by the rhombic prism 468. This second "beamlet" 488 returns in the same way as the first "beamlet" 478, making a second pass through quarter-wave plate 476, but on the opposite side of the main laser beam 466. The polarization of second "beamlet" 488 is likewise rotated another 90 degrees and is therefore reflected by beam splitting interface 472 towards substrate 464 where it illuminates a split position-sensitive photodetector 490. Photodetector 490 is split horizontally, and the power of "beamlet" 488 is distributed vertically between the two halves of split photodetector 490 in proportion to tracking axis of objective lens mount 484. The position of the spot formed by "beamlet" 488 on split photodetector 490 thus provides an indication of the position of the fine servo motor (described below) that controls the orientation of the tracking axis of lens mount 484.

Figure 19:
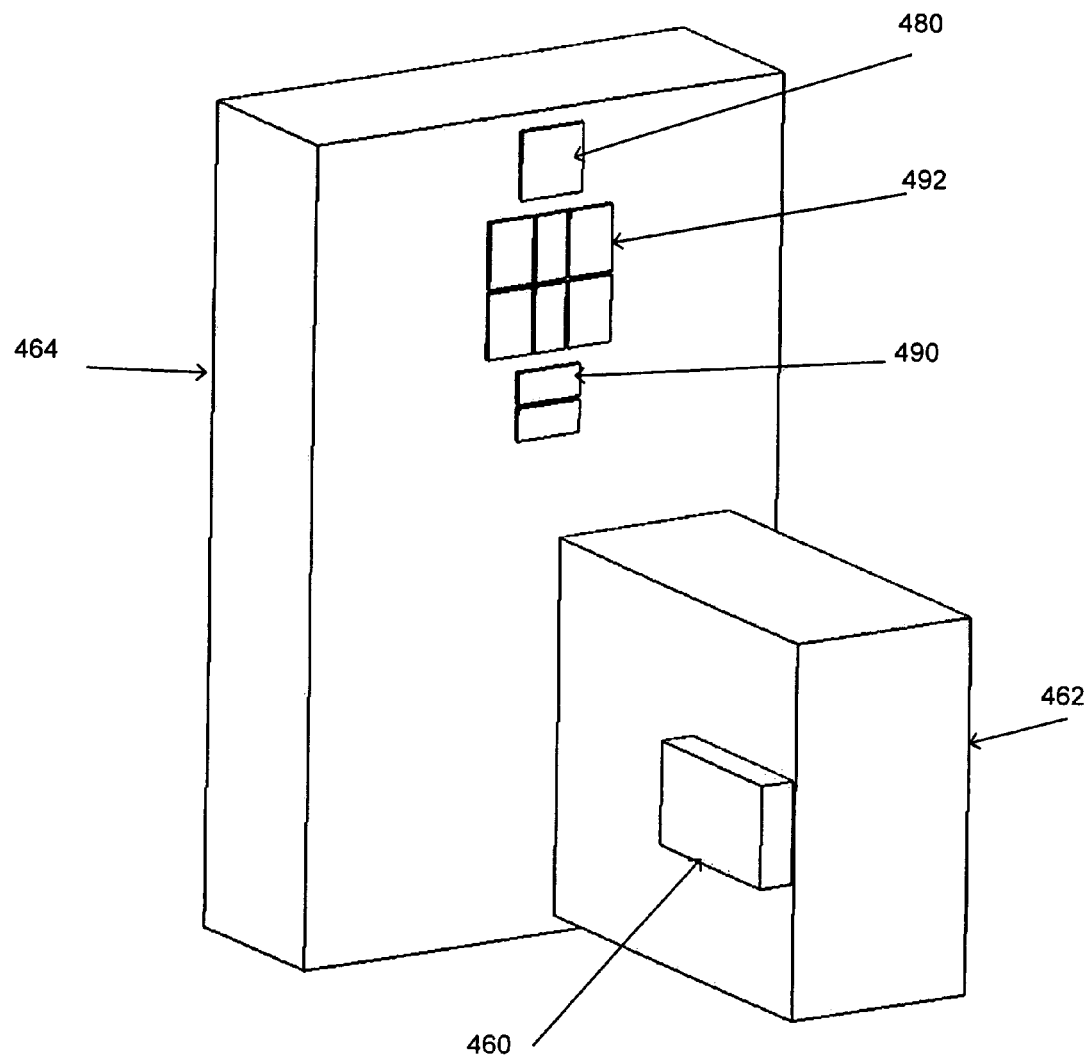
FIG. 19 shows the respective positions of the photodetectors on the substrate.

FIG. 19 shows the respective positions of photodetector 480 and photodetector 490 on substrate 464.

Referring again to FIG. 16, the rest of laser beam 466 proceeds upward through objective readout lens 482 and is focused on the data tracks optical disc 400. The numerical aperture of lens 482 is preferably about 0.72 or greater, as compared with the numerical aperture of 0.6 that is normally used in DVD systems. As noted above, reducing the wavelength of the laser beam from 650 nm to 405 nm increases the track pitch and real density of data on disc 400 by a factor of two. Similarly, increasing the numerical aperture of lens 482 from 0.6 to 0.72 increases the linear density of data on disc 400 by another factor of two, for a total capacity increase of 4X, as compared to the discs normally used in DVD systems.

Laser beam 466 is reflected by optical disc 400 and passes back through objective lens 482, quarter-wave plate 476 and collimating lens 474. Laser beam 466 is then reflected at beam splitting interface 472 towards laser diode/detector substrate 464, where it is incident on a servo photodetector 492. As shown in FIG. 19, servo photodetector 492 has six segments (photodiodes). The segmented structure of servo photodetector 492 allows a determination of the beam distribution and intensity as it returns from the disc and is reflected at beam splitting interface 472.

Since the numerical aperture of lens 482 is high (e.g., at least approximately 0.72), when the collimated beam 466 is focused on a reflective surface, a "cateye" reflector is formed. As a result, when laser beam 466 is focused exactly on disc 400, the reflected beam will effectively retrace its path and re-form as a collimated beam after passing back through objective lens 482. If the position of objective lens 482 is above or below the position that creates an exact focus on disc 400, the return beam below objective lens 482 will converge or diverge, i.e., when lens 482 is too close to disc 400, the return beam will be slightly convergent, and when lens 482 is too far from disc 400, the return beam will be slightly divergent. The variation of the convergence or divergence with focus error is proportional over a small range of focus error, and creates differences in the outputs of the segments of servo photodetector 492. The focus error is determined by taking the sums and differences of the segments of servo photodetector 492 in horizontal and diagonal groups.

The preformatted data tracks on the disc cause the return beam to be diffracted in both the cross track (track) and along track (data) directions. When the beam is centered on a track, the pattern of the return beam projected onto servo photodetector 492 is essentially three superimposed spots: one bright central (or zero-order) spot, and two fainter, first-order diffracted spots, one above and one below the central spot and symmetrically overlapping the central spot. When the focused outbound beam moves slightly off-track, the projected intensity pattern of the reflected beam shifts becomes assymmetric. This asymmetry produces differential intensity changes along the vertical axis of servo photodetector 492. Tracking error signals are obtained by observing the difference between the sum of the outputs of the upper segments of servo photodetector 492 and the sum of the outputs of the lower segments of servo photodetector 492.

Alternatively, a differential phase detection method can be used to generate a track error signal, as is commonly done in DVD players.

The intensity changes caused by the imprinted data pits are detected by monitoring the sum of the outputs of all segments of servo photodetector 492.

Algorithms for controlling the tracking and focus of the laser beam are well known and available from many sources. One tracking and focus system is described in U.S. Pat. No. 6,809,995, entitled "Digital Focus And Tracking Servo System," issued Oct. 26, 2004, and references cited therein, all of the foregoing being incorporated herein by reference in their entirety.

Figure 20:
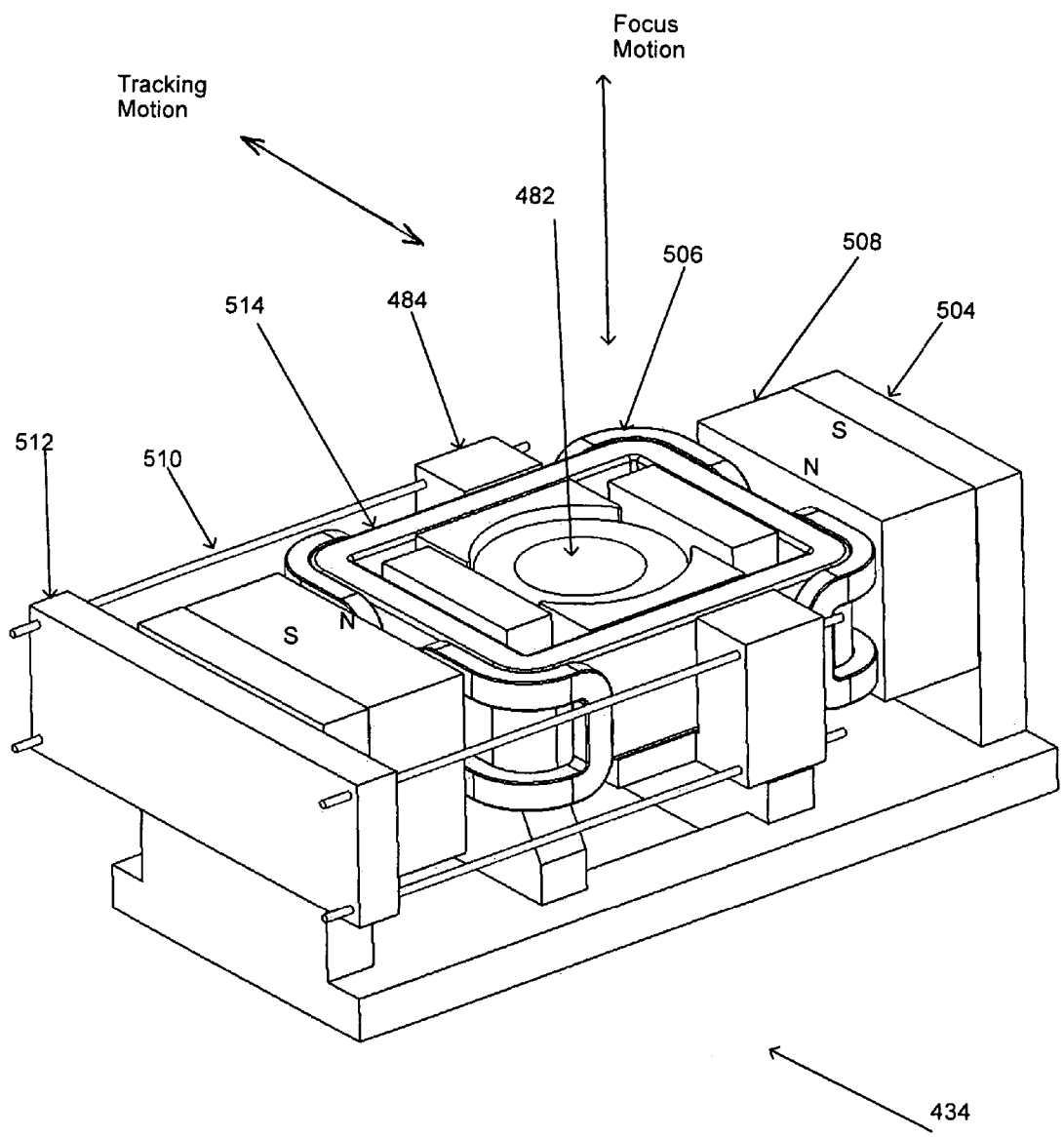
FIG. 20 is a view of the fine tracking/focus mechanism.
Figure 21:
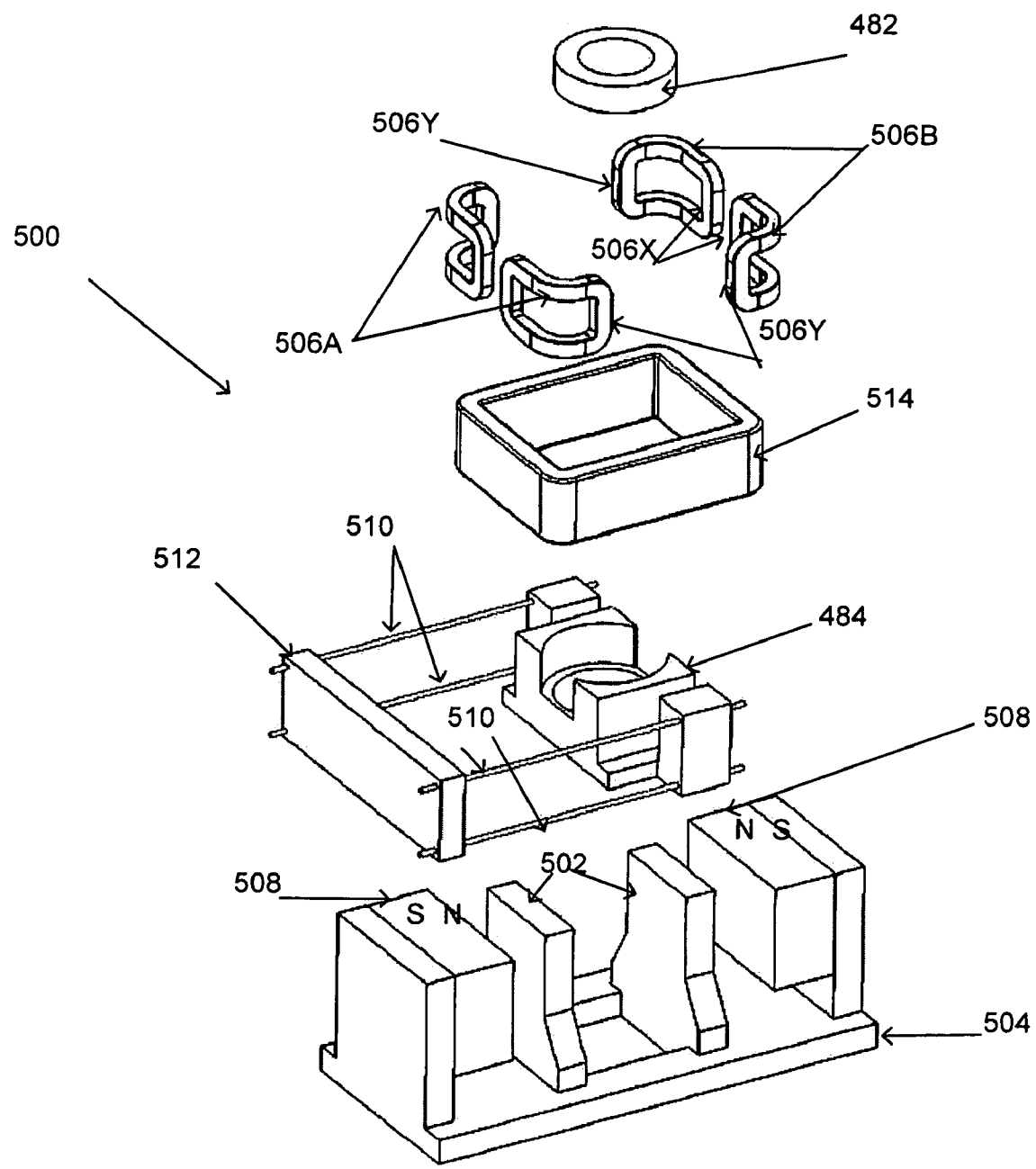
FIG. 21 is an exploded view of the fine tracking/focus mechanism.

Fine tracking/focus mechanism 434 includes a fine servo motor 500. In response to control signals, fine servo motor 500 adjusts the position of objective readout lens 482 so as to maintain the laser beam in focus and follow the tracks on the disc. FIG. 20 is a view of fine tracking/focus mechanism 434, and FIG. 21 is an exploded view of fine tracking/focus mechanism 434 showing the components of fine servo motor 500. Objective readout lens 482, shown at the center of fine tracking/focus mechanism 434, is a component of both optics assembly 432 and fine servo motor 500. As shown, objective lens mount 484 fits in a slot formed between walls 502 in a pole assembly 504.

The tracking motion of objective lens 482 is created by moving objective lens mount 484 in the direction of the "tracking motion" arrows in FIG. 20. This motion is created with four "bent" tracking coils 506, subdivided into two groups 506A and 506B. Fine servo motor 500 contains two permanent magnets 508 which are affixed to pole assembly 504 with like poles facing the center of pole assembly 504. In FIGS. 20 and 21 the north poles are shown facing inward. This forms two magnetic gaps, one on each side of the center of pole assembly 504, with magnetic flux vectors directed symmetrically inward or outward. The four tracking coils 506 are positioned such that one vertical arm 506X of each coil is located in the one of the magnetic gaps. (Conversely, the remaining vertical arms 506Y, shown in FIG. 21, are outside the magnetic gaps between magnets 508.) Coils 506 are connected in series in such a manner that the currents in the vertical arms 506X of coils 506A flow in the opposite direction to the currents in the vertical arms 506X of coils 506B, i.e., when current flows downward in the vertical arms 506X of coils 506A, the current flows upward in the vertical arms 506X of coils 506B, and vice-versa. Depending on the direction of the currents, coils 506 and the remainder of fine servo motor 500 (including lens 482) will be subjected to an electromotive force in one of the directions of the "tracking motion" arrows.

Objective lens mount 484 is attached to four flexure wires 510, the other ends of which are attached to a mounting plate 512. Flexure wires 510 allow lens mount 484 and lens 482 to move in the direction of the "tracking motion" and "focus motion" arrows shown in FIG. 20 but prevent it from moving in an direction orthogonal to the tracking and focus motions.

Two of flexure wires 510 also provide the electrical connections for tracking coils 506. Both mounting plate 512 and objective lens mount 484 are made of an insulating material such as a plastic resin having a Young's modulus of $2.8 \times 10^4$ MPa ($4.4 \times 10^6$ psi) or higher. Thus, flexure wires 510 are insulated from the rest of the assembly by the mounting plate 512 and objective lens mount 484.

Flexure wires 510 can be made of beryllium copper or some other high yield-strength material to minimize damage in operation or assembly. Flexure wires 510 should have a low electrical resistance to minimize any damage from heating. They are preferably corrosion resistant and could be coated or sleeved for vibration damping, e.g., with a thin elastomer film or molded part.

The vertical motion necessary to focus objective readout lens 482 is provided by a rectangular focus coil 514, which is enclosed within the four tracking coils 506 when fine servo motor 500 is assembled (FIG. 20). Coil 514 is positioned in the magnetic gaps between permanent magnets 508, and provides summed Lorentz forces which move coil 514 up or down when current flows through it. For the reasons described above, coil 514 is preferably supplied with current through the two flexure wires 510 that are not used to supply current to tracking coils 506.

To minimize any tilting of lens 482, it is desirable that the net electromotive force vectors provided by coils 506 and 514 in the tracking and focus directions, respectively, pass through the central of gravity of fine servo motor 500 (including lens 482) and objective lens mount 484.

Using flexure wires 510 to carry current to tracking coils 506 and focus coil 514 allows the movement of lens 482 to approximate a smooth, orthogonal movement in tracking and focus directions. Using other wires to make the electrical connections may introduce moments which disturb this motion in an uncontrollable way.

It will be understood that optics assembly 432 is only one embodiment of an optics assembly that could be used in a disc drive of this invention. Although optics assembly 432 is compact in design and low in power, it should be apparent that a number of alternative head designs meeting these two criteria are possible and therefore suitable for application in a disc drive of this invention. Such designs could utilize CD-like optical configurations such as those described in U.S. Pat. No. 5,033,042 (three-beam) or U.S. Pat. No. 5,694,385 (single beam), each of which is incorporated herein by reference in its entirety, modified with optics suitable for 405 nm and the higher 0.72 NA lens described herein. Such pickup modules would normally include a laser, polarizing beam splitter, collimator, $\lambda/4$ waveplate, objective lens, forward photodetector, and servo/data quad detector as indicated in the above referenced patents. These components perform the same functions as are described herein, with the combination of the polarizing beam splitter and $\lambda/4$ waveplate serving to separate the light reflected from the disc and redirect it to the servo/data quad detector. The polarizing beam splitter also separates a small amount of the light incident from the laser and redirects it to the forward photodetector for monitoring the laser power. This type of optical path is typical in CD players and can also be made compact and low power.

Optical disc drive 30 is manufactured to an extremely small form factor. For example, disc drive 30 may measure 49.90 mm×44.70 mm×14.90 mm. This is made possible principally by the use of a short-wavelength laser beam and high numerical aperture lens, which together facilitate the use of a high areal density, removable optical ROM disk. This, combined with a highly efficient data compression algorithm, allows a small diameter optical disc to hold an extended, high-quality entertainment experience. For example, using a 405 nm blue laser, a 0.72 NA lens and MPEG-4 data compression, a 32 mm-diameter optical disc can hold a 133-minute, DVD-quality movie. The small diameter optical disc in turn permits the optical disc drive to be made very small.

IC chips mounted on optical drive PCBA 38, shown in FIG. 2, represent the optical drive electronics that control the optical drive module 34.

Figure 22:
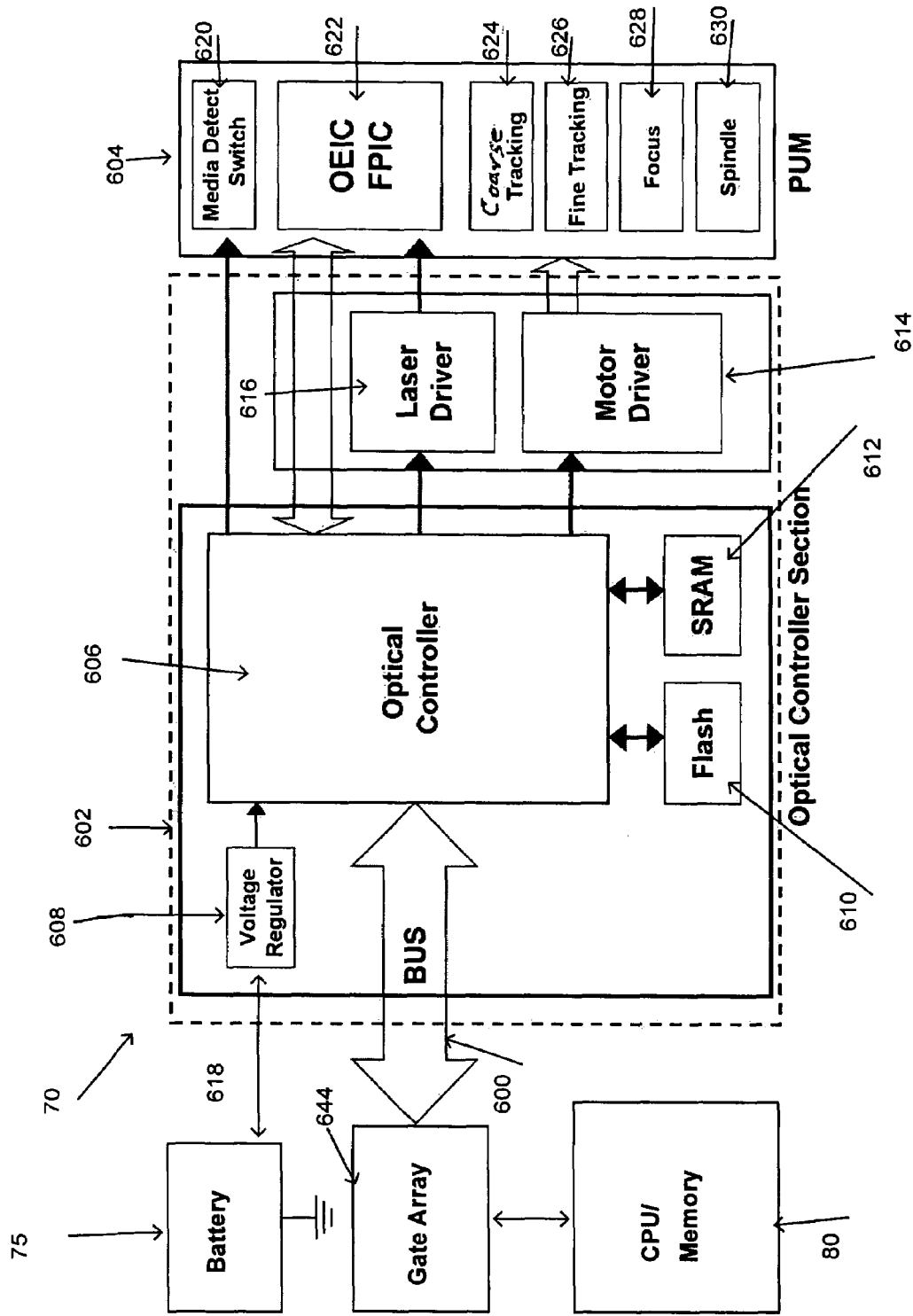
FIG. 22 is a block diagram of the optical drive electronics of the disc drive and the battery and CPU/memory of the cell phone.

A block diagram of optical drive electronics 70 and a battery 75 and CPU/memory 80 of cell phone 10 are shown in FIG. 22. Battery 75 and CPU/memory 80 are typically located in cell phone 10 outside disc drive 30. CPU/memory 80 can be connected to optical drive electronics 70 via a bus 600. Optical drive electronics 70 contains two basic components: an optical controller section 602 and a pick-up module 604. The state of the art in these controllers is very advanced and highly integrated, so a minimal number of IC chips are necessary. The main element of optical controller section 602 is an optical controller IC 606, which can be realized as either a single or dual IC. In dual IC designs, the controller function is realized using a digital controller IC and an analog front end processor. In single IC designs these two functions are combined.

Table 1 lists several commercially available ICs that could be used in the dual IC configuration of optical controller IC 606.

TABLE 1

| Digital Controller IC | Analog Front End Processor |
|---|---|
| M5705 DVD-ROM Controller IC | SP3721D Analog Front-End IC |
| AMT 2002 DVD Digital Servo | AMT 2001 DVD AFE IC |

The STA1010 optical controller IC from ST Microelectronics could be used in a single-IC design of optical controller IC 606.

The optical controller section 602 also contains a voltage regulator 608, a flash memory 610, a static random-access memory (SRAM) 612, a motor driver IC 614 and a laser driver IC 616. Motor driver IC 614 and laser driver IC 616 receive control signals from the optical controller IC 606. The STA1015 available from ST Microelectronics could be used for motor driver IC 614. Voltage regulator 608 is powered by a direct connection 618 to battery 75 of cell phone 10 and is controlled by an on/off control line that is connected to CPU/memory 80 via bus 600.

The other major component of optical drive electronics 70 is pick-up module 604. Pick-up module 604 includes a media detect switch 620, an opto-electric IC (OEIC) and forward photodiode IC (FPIC) 622, course tracking control circuitry 624, fine tracking control circuitry 626, focus control circuitry 628 and the spindle motor control circuitry 630.

The digital controller IC within optical controller IC 606 includes the servo digital signal processor (DSP) required to implement the servo/seek functions of optical disc drive 30, the microprocessor required to control disc drive 30 and the interface between disc drive 30 and cell phone 10, the analog-to-digital (A/D) and digital-to-analog (D/A) converters required to interface to optical pick-up module 604, the read-back channel, the encoder-decoder (EnDec), the error correction circuitry (ECC), the media detect switch, and the physical format circuitry.

In this embodiment the interface between optical controller IC 606 and CPU/memory 80 is an ATAPI/IDE interface, although other interface standards, such as serial ATA (SATA), parallel ATA (PATA), USB, and firewire may also be used.

The digital controller IC within optical controller IC 606 is specific for the physical format of the media being processed. The format of the disc can be the format described in application Ser. No. 10/383,193, filed Mar. 5, 2003, which is incorporated herein by reference in its entirety. This format allows current DVD video and DVD-ROM digital controller ICs to be used in disc drive 30.

The front-end processor within optical controller IC 606 includes the analog circuitry required to interface the electronics within the pick-up module 604, such as the OEIC/FPIC 622, with the digital controller IC. The front-end processor also contains the analog electronics required to control motor driver IC 614 and laser driver IC 616 in addition to analog equalizers for the data channel.

Flash memory 610 contains the operating software (firmware) for the microprocessor within optical controller IC 606 and SRAM memory 612 can be used to buffer the data being read from optical disc 400. In the preferred embodiment, at least 8 Mbyte of SRAM is desired to ensure a smooth, uninterrupted video playback in the presence of the external shock and vibration characteristic of a portable video player environment. In order to obtain DVD-quality video using a current state-of-the-art compression technology such as MPEG-4, the average data rate for the audio/video data stream from the disc drive should be at least 1.0 Mbit/sec. In this case, 8 Mbyte of SRAM would allow for about 64 seconds of buffered video playback. Future advances in encryption technology may allow for smaller buffer sizes.

Motor driver IC 614 is required to drive the carriage drive (coarse tracking) motor 370, the fine servo motor 500, and the motor in spindle assembly 50.

As described above, the optical drive module 34 contains short wavelength (405 nm) laser diode 460, which requires suitable drive electronics. The 405 nm laser diode requires a higher operating voltage than the more common red (680 nm) lasers used in DVD players and the infrared (780 nm and 830 nm) lasers used in CD players.

Figure 23:
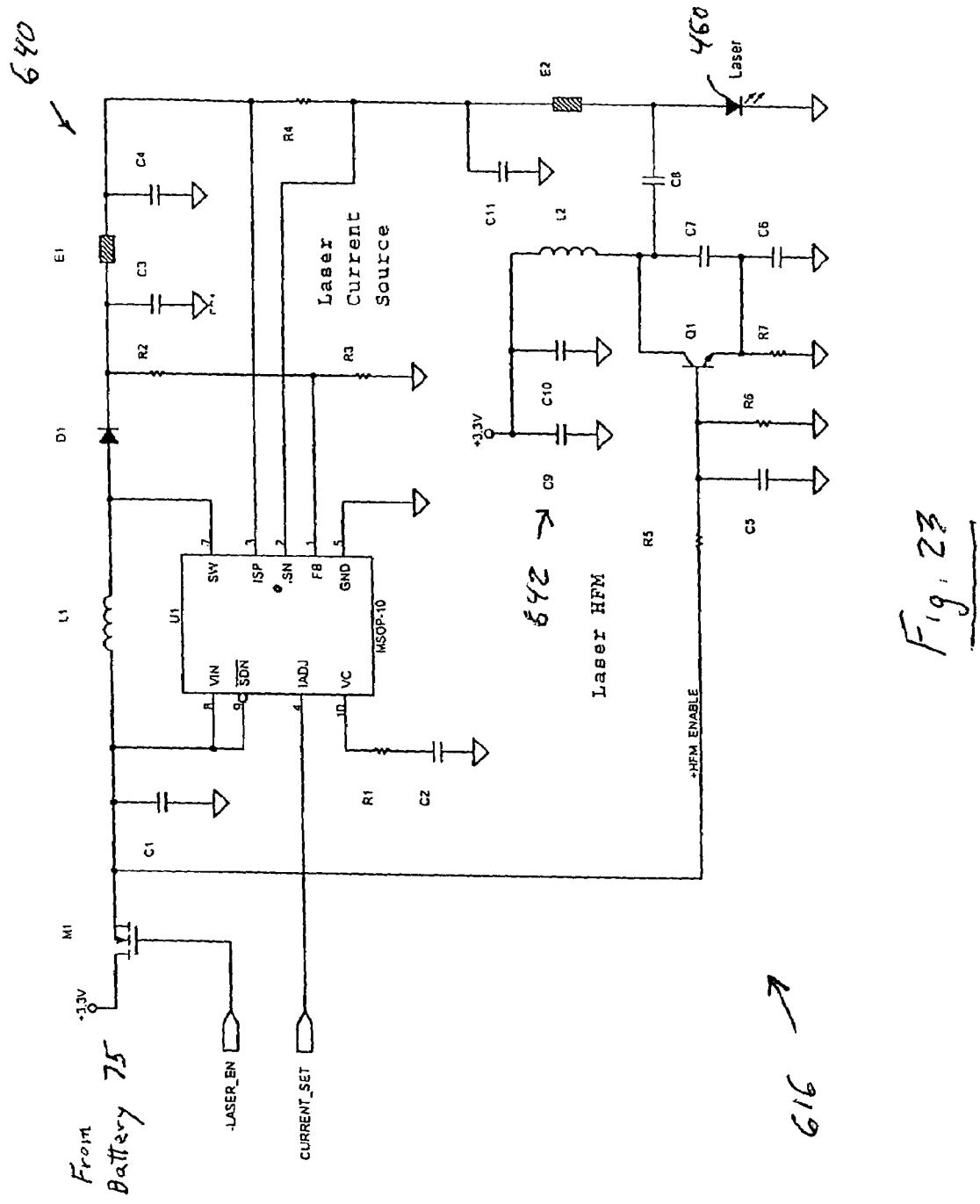
FIG. 23 is a schematic circuit diagram of the laser driver IC.

FIG. 23 is a diagram of a circuit that may be used for laser driver IC 616. Laser driver IC 616 includes a voltage converter/regulator 640 which steps up the 3.3 V supply available from battery 75 to the 6.5 V maximum required by laser diode 460. Resistor R4 is used as a sense/feedback resistor. In addition, a high-frequency RF modulator (HFM) 642 is provided to reduce the laser noise and improve the read back performance.

The outputs from voltage converter/regulator 640 and HFM 642 are combined to produce both DC and AC currents in laser diode 460. Voltage converter/regulator 640 acts as a DC current source. HFM 642 acts as an AC current source. The AC current is coupled to laser diode 460 via capacitor C8 and serves to reduce mode partition noise in laser diode 460. The DC current is supplied to laser diode 460 via blocking ferrite E2 and serves to provide the DC laser threshold current and the DC component of the read current. Blocking ferrite E2 also prevents the AC current from HFM 642 from entering voltage converter/regulator 640. Typically the AC current is adjusted so that the optical power from laser diode 460 is increased by 2-5× from that observed with only the DC current. The exact power factor depends on the specifics of the optical system and laser being used.

HFM 642 is a standard RF oscillator based around biased transistor Q1 and is set to oscillate at a frequency of 400-600 MHz. It is designed to provide 30 mA into a 50 Ohm load. This circuit is typically integrated into a module that is mounted directly onto laser diode 460 to minimize losses and radiation of RF energy. Voltage converter/regulator 640 (the DC current source) includes a standard DC-DC converter (chip U1, inductance L1, diode D1) which uses resistor R4 in a feedback loop to stabilize the current. The signal at the output of diode D1 is filtered by ferrite E1, resistor R2 and capacitors C3 and C4 to remove the converter switching noise. Since a 405 nm blue laser requires a maximum compliance voltage of 6.5V, a DC-DC converter is used to upshift the 3.3V supply voltage. The circuit shown takes an input control signal (CURRENT_SET) of 0-1.6V and outputs a corresponding DC output laser current of 90-0mA.

FET switch M1 acts to disable both voltage converter/regulator 640 and HFM 642 by removing the input 3.3V DC supply voltage. LASER_EN is a control signal that is used to turn FET switch M1 on and off.

Table 2 contains a list of illustrative values of the components of the circuit for laser drive 616 shown in FIG. 23.

TABLE 2

| Component | Value |
| --- | --- |
| R1 | 2.00 kΩ |
| R2 | 402 kΩ |
| R3 | 100 kΩ |
| R4 | 0.56 Ω |
| R5 | 806 Ω |
| R6 | 1.21 kΩ |
| R7 | 80.6 Ω |
| C1 | 1.0 µF |
| C2 | 10 nF |
| C3 | 4.7 µF |
| C4 | 1.0 µF |
| C5 | 120 pF |
| C6 | 56 pF |
| C7 | 15 pF |
| C8 | 15 pF |
| C9 | 82 pF |
| C10 | 120 Pf |
| C11 | 120 Pf |
| L1 | 2.2 µh |
| L2 | 8.2 Nh |

Table 3 lists by model number the other components that may be used in the circuit of FIG. 23.

TABLE 3

| Component | Model No. |
| --- | --- |
| M1 | IRLML6401 |
| Q1 | NE68819 |
| E1 | BLM15AG601 |
| E2 | BLM15AG601 |
| D1 | MA2ZD18 |
| U1 | LT1618EMS |

Referring again to the block diagram of FIG. 22, CPU/memory 80 can be linked to optical drive electronics 70 via a flex lead represented as bus 600. Optical drive electronics 70 uses an ATAPI/IDE interface while cell phone 10 might use a USB, SD or mini SD interface. If the CPU/memory 80 does not directly support an ATAPI protocol, then a gate array 644 may be needed to bridge the interface between optical controller IC 606 and CPU/memory 80.

The electrical interface between cell phone 10 and disc drive 30 consists of power leads, a data exchange interface, and, an audio interface. The interconnection between these two devices may be accomplished using an industry standard low profile ZIFF connector and a thin, flexible printed circuit (FPC or flex). The power leads carry current from battery 75 and ground to disc drive 30. Disc drive 30 is preferably powered directly from battery 75 to improve efficiency and extend the battery life. As noted above, the data exchange interface in this embodiment is an ATAPI/IDE interface, but alternatively it could be any of a number of industry standard protocols such as ATA/ATAPI, serial ATA (SATA), parallel ATA (PATA), etc. The audio interface provides connections for the left and right audio channels which are driven by optical controller IC 606.

Figure 24:
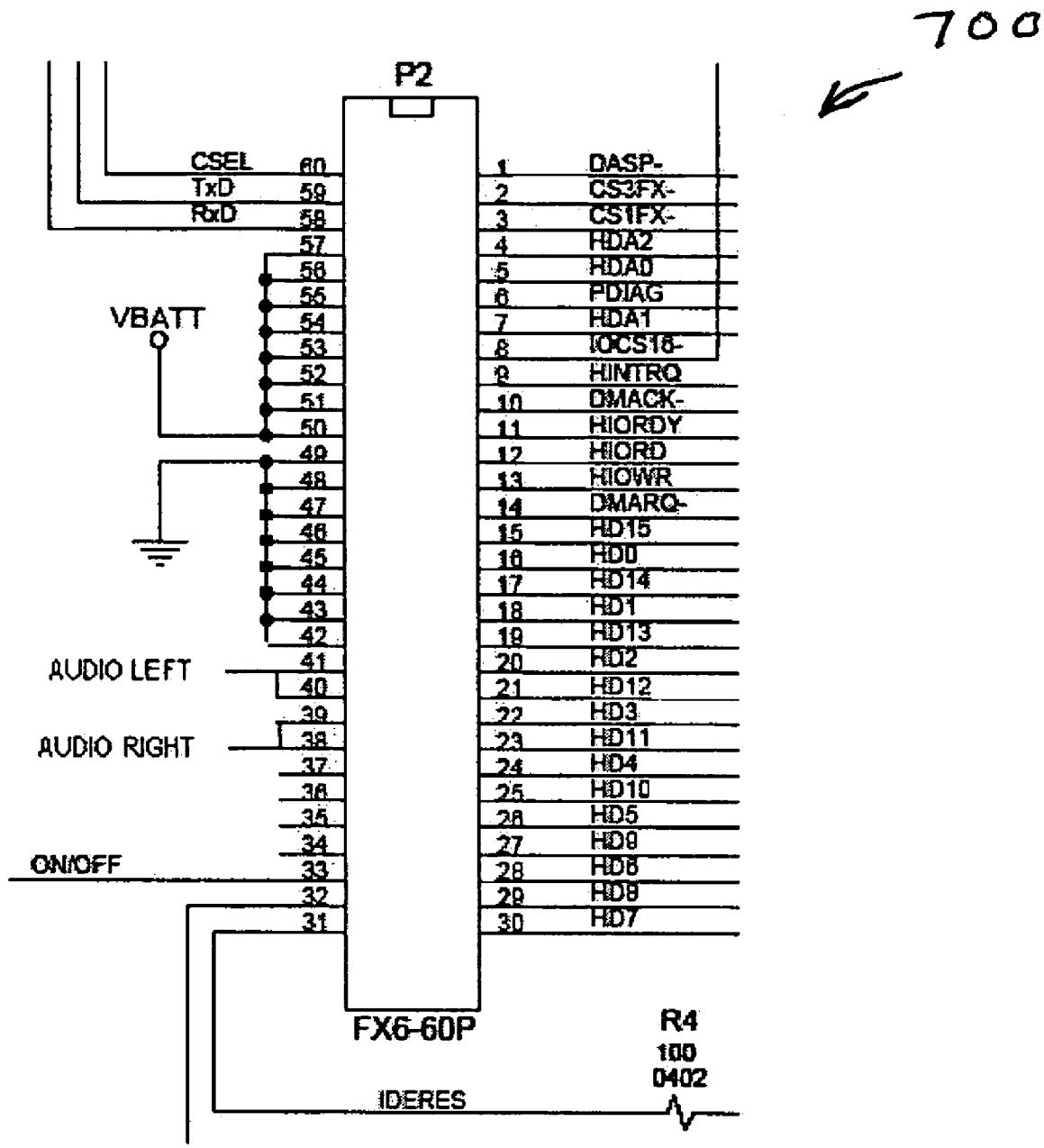
FIG. 24 is a pin diagram of a connector that may implement a standard ATAPI drive interface between the cell phone and the disc drive.

FIG. 24 gives an example of the pin definitions for an FX6-60P connector 700 which may be used to implement an ATAPI interface between disc drive 30 and cell phone 10. The ATAPI interface is implemented using pins 1-31 and pin 60. Pins 58 and 59 implement a standard RS-232 serial interface for drive debug and error reporting. The battery voltage from battery 75 is on pins 50-57 and ground is on pins 42-49. Multiple pins are used for battery voltage and ground to increase the current capability of the interface.

The audio interface is implemented using pins 38-41. Pin 33 is a drive on/off switch which allows the cell phone 10 to shut disc drive 30 completely off to conserve battery power.

It is important to conserve battery power in order to operate disc drive 30 over a substantial period of time and thereby maximize the entertainment experience. In practice, disc drive 30 "spins up" periodically to transfer data from the disc to a buffer memory, which could be SRAM 612 or part of CPU/memory 80. The remainder of the time, between spin-ups, disc drive 30 is in a quiescent state, in which relatively little battery power is consumed. To conserve battery power, it is advantageous for disc drive 30 to have a minimal duty cycle, i.e., the proportion of the time that the drive is reading data from disc 400 and transmitting the data to the buffer memory.

The duty cycle is a function of (a) the compression factor used in storing the data on disc 400 and (b) the rate at which the data is transferred from disc drive 30 to cell phone 10. For example, a 133-minute video recorded with VGA resolution (640×480 pixels/frame) and 24 bit color would occupy over 200 GB in its uncompressed form. Using the compression algorithm MPEG-4 and a compression factor of 200 it can be compressed to approximately 1 GB while maintaining at least a DVD-quality output. At a data transfer rate of 10 Mbit/sec, the compressed data can be transferred to cell phone 10 in approximately 13.3 minutes This equates to a duty cycle of $13.3/133$ or about 10%.

The ATAPI interface between optical controller IC 606 and CPU/memory 80 supports a data transfer rate much higher than 10 Mb/sec. However, in one embodiment the maximum sustained data transfer rate from optical disc 400 to disc drive 30 at a 1× read speed is about 10 Mb/sec. Other embodiments may use read speeds greater than 1×, which would allow for better utilization of the data transfer bandwidth of the ATAPI interface (or another industry standard high-speed interface such as USB, Serial ATA, etc.). This would allow the duty cycle to be reduced below 10%.

Each time, the spin-up begins when the buffer memory is nearly empty. For example, in the example above, if the buffer memory has a capacity of 512 MB, disc drive 30 needs to operate for only two 6.7-minute periods to transfer the 133 minute video to cell phone 10. If the buffer memory has a capacity of 256 MB, disc drive 30 would operate for four 3.3-minute periods, and so forth.

A limiting factor for the data compression factor is the quality of the video output in cell phone 10. Using the compression algorithm MPEG-4, the data can be compressed by a factor of 200 while yielding a DVD-quality video output. Audio content is also included in the data stored on the disc, but it is normally a relatively small proportion of the total amount of data stored on the disc.

In addition, disc drive 30 includes an on/off function which causes it to power down when it is not in use. In the "power down" mode, disc drive 30 uses almost no power from battery 75. The on/off line enables/disables the voltage regulator 608 in FIG. 22. Disabling voltage regulator 608 completely shuts off (powers down) disc drive 30.

Although the present invention is illustrated in connection with specific embodiments for instructional purposes, the present invention is not limited thereto. For example, the embodiment described above shows a microminiature optical disc drive embedded in a cell phone, but according to this invention an optical disc drive may be mounted on or in other types of portable handsets such as personal digital assistants (PDAs), portable media players (PMPs), hand held navigational units and other kinds of handheld computers. Various adaptations and modifications may be made without departing from the scope of the invention. Therefore, the spirit and scope of the appended claims should not be limited to the foregoing description.

What is claimed is:

1. A combination comprising a cell phone and an optical disc drive, the optical disc drive and components of the cell phone being mounted within a single housing, wherein the optical disc drive comprises an optics assembly for reading data from an optical disc, the optics assembly comprising a laser diode adapted to produce a laser beam, the combination further comprising an optical data storage disc, the optical data storage disk being enclosed in a cartridge, the cartridge being removably mounted in the disc drive, and wherein the housing comprises a hinged optical disc drive access door which swings outward from the housing to expose a cartridge load module, the cartridge being held in the cartridge load module.

2. The combination of claim 1 wherein the diameter of the optical data storage disc is about 32 mm.

3. The combination of claim 2 wherein the optical disc drive measures approximately 49.90 mm×44.70 mm×14.90 mm.

4. The combination of claim 1 wherein the laser diode is adapted to produce a blue laser beam.

5. The combination of claim 4 wherein the optics assembly further comprises an objective lens, the laser beam passing through the objective lens.

6. The combination of claim 5 wherein the objective lens has a numerical aperture of 0.72.

7. The combination of claim 1 wherein the cartridge comprises a shutter, the shutter being in an open position.

8. The combination of claim 1 wherein the cartridge load module comprises a cartridge load sleeve, the cartridge being retained in the cartridge load sleeve.

9. The combination of claim 8 wherein the access door is spring-biased toward an open position.

10. The combination of claim 9 wherein the access door is coupled to the cartridge load sleeve such that when the access door swings to the open position, the access door pulls the cartridge load sleeve upward, exposing an entrance to the cartridge load sleeve and allowing the insertion of the cartridge into the cartridge load sleeve.

11. The combination of claim 10 wherein the cartridge load module is positioned above an optical drive module, the cartridge load module being pivotably mounted to the optical drive module, the access door being pivotably mounted to the cartridge load module.

12. The combination of claim 11 wherein the access door is coupled to the cartridge load sleeve by means of a mechanism comprising a pin and a slotted member, the pin being slideable with a slot in the slotted member.

13. The combination of claim 1 wherein the optics assembly comprises a spindle chuck and a magnet.

14. The combination of claim 13 wherein a magnetic retention ring is attached to the optical data storage disc, the optical data storage disc being held on the spindle chuck by a magnetic force between the magnet and the magnetic retention ring.

* * * * *